US012452258B2

(12) United States Patent
Kim et al.

(10) Patent No.: US 12,452,258 B2
(45) Date of Patent: Oct. 21, 2025

(54) NETWORK SECURITY MONITORING DEVICE AND METHOD BASED ON SECURITY PACKET OF TERMINAL

(71) Applicant: MAGDATA INC., Seoul (KR)

(72) Inventors: Jong Min Kim, Seoul (KR); Ho Jeong Hwang, Seongnam-si (KR); Seong Ki Shin, Seoul (KR)

(73) Assignee: MAGDATA INC., Seoul (KR)

( * ) Notice: Subject to any disclaimer, the term of this patent is extended or adjusted under 35 U.S.C. 154(b) by 160 days.

(21) Appl. No.: 18/573,985

(22) PCT Filed: Jun. 22, 2022

(86) PCT No.: PCT/KR2022/008852
§ 371 (c)(1),
(2) Date: Dec. 22, 2023

(87) PCT Pub. No.: WO2022/270893
PCT Pub. Date: Dec. 29, 2022

(65) Prior Publication Data
US 2024/0333726 A1 Oct. 3, 2024

(30) Foreign Application Priority Data
Jun. 23, 2021 (KR) ........................ 10-2021-0081756
Jun. 22, 2022 (KR) ........................ 10-2022-0076140

(51) Int. Cl.
*G06F 12/00* (2006.01)
*H04L 9/32* (2006.01)
(Continued)

(52) U.S. Cl.
CPC .......... *H04L 63/1408* (2013.01); *H04L 69/16* (2013.01); *H04W 28/0273* (2013.01)

(58) Field of Classification Search
None
See application file for complete search history.

(56) References Cited

U.S. PATENT DOCUMENTS 12,074,888 B2 * 8/2024 Kim .................... H04L 63/1416
2008/0304498 A1 * 12/2008 Jorgensen ........... H04L 12/4641
370/245
(Continued)

FOREIGN PATENT DOCUMENTS

KR 10-2017-0096793 A 8/2017
KR 10-2018-0009520 A 1/2018
(Continued)

*Primary Examiner* — Christopher B Robinson
(74) *Attorney, Agent, or Firm* — INVENSTONE PATENT, LLC

(57) ABSTRACT

The present invention relates to a network security monitoring device and method based on a security packet of a terminal. The network security monitoring method performed by a network monitoring device according to an aspect of the present invention may comprise the steps of: monitoring a state of a client terminal; obtaining a security inspection packet generated on the basis of a result of the monitoring from a network; obtaining a mirroring packet mirrored by a network switching device from the network; and performing a security monitoring with respect to the network on the basis of at least one of the security inspection packet and the mirroring packet.

20 Claims, 21 Drawing Sheets

Server DB
flow DB
UX DB
1200
Presentation (Web)
1240
User Interface
Statistics
Search
Alert
Query
UX/UI
1230
Service Module
packet
Header
Payload
detail
transaction
Packet Analysis Module
1220
DB
Service DB
Analysis Engine
1222
1232
1. Packet Collection
2. Primary Analysis (HTTP/DB/HTS/...)
3. Secondary Analysis (URI, Source-IP Dest-IP time)
1210
1210
1210
1224-1
Switch 1
Switch 2
1224-2
About 120 elements per transaction

(51) Int. Cl.

| | |
|---|---|
| ***H04L 9/40*** | (2022.01) |
| ***H04L 69/16*** | (2022.01) |
| ***H04W 28/02*** | (2009.01) |

(56) References Cited

U.S. PATENT DOCUMENTS

| | | | | |
|---|---|---|---|---|
| 2016/0044106 | A1* | 2/2016 | Kjendal | H04L 67/1095 709/225 |
| 2017/0302554 | A1* | 10/2017 | Chandrasekaran | H04L 43/0811 |
| 2018/0288126 | A1* | 10/2018 | Smart | H04N 7/181 |
| 2020/0329059 | A1 | 10/2020 | Anderson et al. | |
| 2021/0297351 | A1* | 9/2021 | Vegesna | H04L 12/4633 |
| 2023/0188550 | A1* | 6/2023 | Chiang | H04L 43/04 709/224 |

FOREIGN PATENT DOCUMENTS

| | | | | |
|---|---|---|---|---|
| KR | 10-2018-0047935 | A | 5/2018 | |
| KR | 10-2163279 | A | 10/2020 | |
| WO | WO-2016195344 | A1 * | 12/2016 | H04L 67/02 |

* cited by examiner

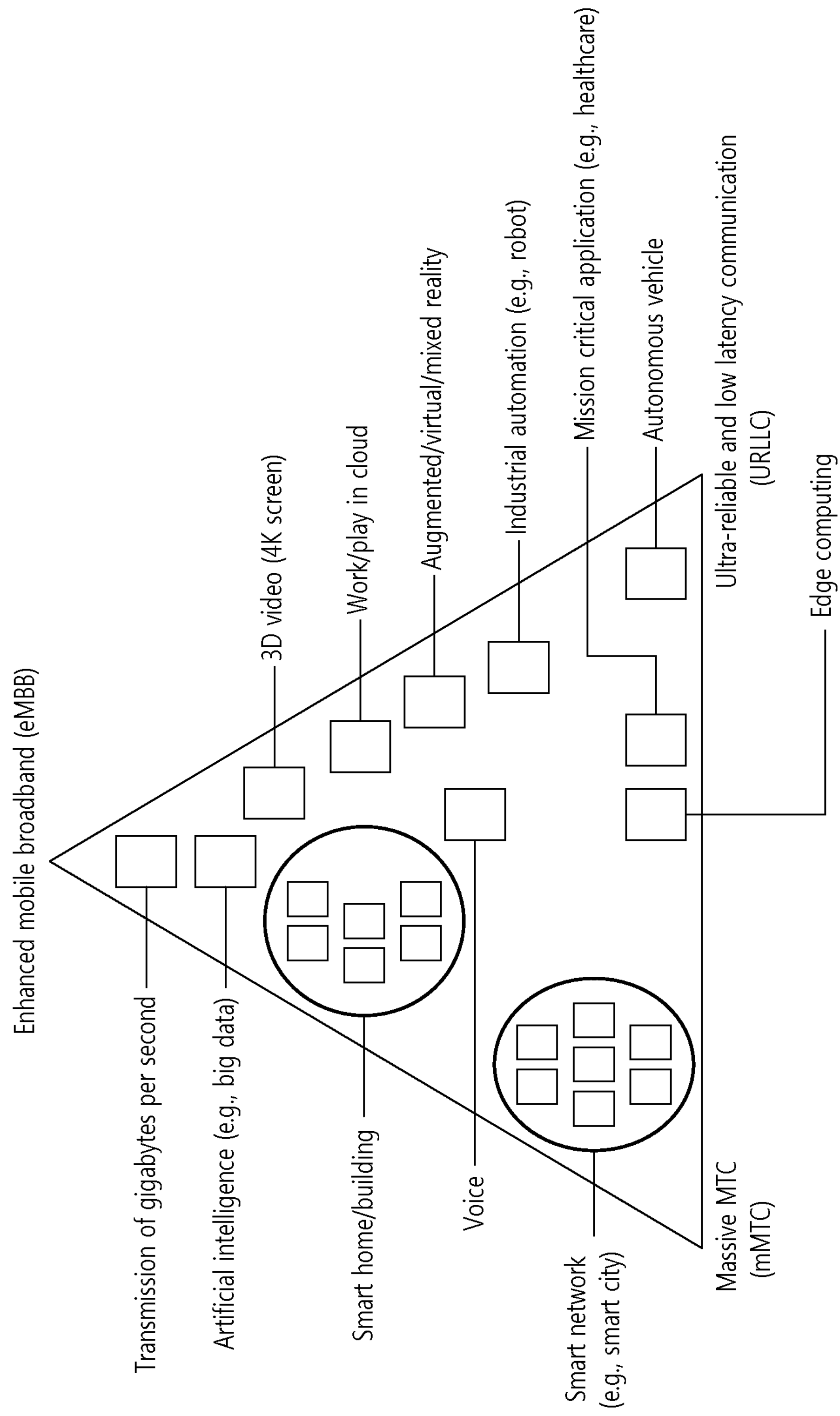
FIG. 9
Enhanced mobile broadband (eMBB)
3D video (4K screen)
Work/play in cloud
Augmented/virtual/mixed reality
Industrial automation (e.g., robot)
Mission critical application (e.g., healthcare)
Autonomous vehicle
Ultra-reliable and low latency communication (URLLC)
Edge computing
Transmission of gigabytes per second
Artificial intelligence (e.g., big data)
Smart home/building
Voice
Smart network (e.g., smart city)
Massive MTC (mMTC)

NETWORK SECURITY MONITORING DEVICE AND METHOD BASED ON SECURITY PACKET OF TERMINAL

CROSS-REFERENCE TO RELATED APPLICATIONS

This application is a National Stage filing under 35 U.S.C. 371 of International Application No. PCT/KR2022/008852, filed on Jun. 22, 2022, which claims the benefit of earlier filing date and right of priority to Korean Application No. 10-2021-0081756, filed on Jun. 23, 2021, and Korean Application No. 10-2022-0076140, filed on Jun. 22, 2022 in the Korean Intellectual Property Office, the contents of which are all hereby incorporated by reference herein in their entirety.

BACKGROUND

Technical Field

The present disclosure relates to a device and method for monitoring network security based on a security packet of a terminal.

Background Art

A network generally includes a communication link and various devices with communication capabilities connected to the communication link. Here, the devices include computers, peripheral devices, routers, storage devices, and appliances with processors and communication interfaces. Here, the term "device" typically includes logical devices or other units having functionality and an ability to exchange data, and may include not only all home devices but also general purpose computers.

Traditional network systems include a client device used by a user and various server devices associated with a web site. The client device, in general, makes a connection request to a server with a specific IP address and accesses it after a standby time. At this time, if multiple client devices of multiple users access the server all at a particular point in time, the performance of a network service associated with the server may be degraded due to a bottleneck. When there is an issue with service performance or quality, the user may experience longer latency due to a delay and the rate of service use by the user will decrease, which leads to decreased productivity and sales. Moreover, the cost of IT operations will increase, and the server administrator and/or the owners of related businesses may end up with poor outcomes, that is, a decline in company competitiveness.

In particular, devices in a 5G communication network operate on the assumption that, in the 5G communication network, communication between devices takes place within the bounds of performance, and thus, it is very important to quickly find out how fast communication between devices is taking place, and, if the communication does not flow smoothly, what the cause of the performance degradation is. However, this problem is not being dealt with properly because there is no proper service for finding the exact cause of such performance degradation. As a result, the issue of performance degradation is not handled properly, and performance improvements cannot be achieved at the right timing, thereby causing difficulties in overall system operation.

Therefore, it is necessary to quickly find the cause of performance degradation and deal with this as soon as possible.

FIG. 1 is a conceptual diagram for explaining a conventional process for performing network service management.

Referring to FIG. 1, an IT team manager gives instructions related to quality management to a network operation part, a server operation part, a database development part, and an application development part.

When there is a particular service issue, the person in charge of each part individually assesses any problems with IT devices he or she manages and reports on them. That is, they are not able to quickly identify the cause of a problem and properly deal with performance degradation issues because they see a problem with a particular service as something separate from other things, as they put it "No problem with the application", "No problem with the network" and/or "Nothing wrong with the server". That is, service improvements cannot be achieved at the right timing.

Meanwhile, the development of Internet of Things (IoT) makes a lot of changes to traditional network structures. As a large number of devices using IoT participate in a network, the number of client terminals connected to one server increases definitely at an exponential rate, and it is getting more and more difficult to diagnose the overall network including the respective devices. Furthermore, when there arises a security problem with one of these IoT devices, it may pose a threat to the overall network. However, the IoT devices are more vulnerable to security problems compared to components of conventional networks.

SUMMARY

A technical object of the present disclosure is to provide a device and method for monitoring network security based on a security packet of a terminal.

A network security monitoring method performed by a network monitoring device according to an aspect of the present disclosure includes: monitoring a status of a client terminal; obtaining a security check packet, generated based on a result of the monitoring, from a network, the security check packet containing user ID (UID) information of the client terminal, length information, and monitoring result information; obtaining a mirroring packet, mirrored in a network switch device, from the network; and performing security monitoring on the network based on at least one of the security check packet and the mirroring packet.

The security monitoring of the network may be performed by the network monitoring device that is assigned an IP address on the network, and the obtaining of the security check packet from the network may include receiving the security check packet by the network monitoring device using the IP address.

The security check packet may be a TCP packet format that contains at least a TCP header and a TCP payload, and the TCP payload may contain field information of at least one of a UID field, a length field, and a monitoring result field.

The security monitoring of the network may be performed by the network monitoring device that is not assigned an IP address on the network, and the obtaining of the security check packet from the network may include obtaining the security check packet by the network monitoring device through monitoring a path on the network.

The security check packet may be a UDP packet format that contains at least a UDP header and a UDP payload, and the UDP payload may contain field information of at least one of a UID field, a length field, and a monitoring result field.

The UID information may be information used to uniquely identify at least one of the client terminal or a client monitoring device that monitor a status of the client terminal, the length information may be information indicating a length of the monitoring result information, and the monitoring result information may be information indicating a result of monitoring a status of the client terminal.

The security check packet may be generated from a client monitoring device integrated into the client terminal.

The security monitoring of the network may be performed by a network monitoring device that is located and operating in at least one of the following: a standalone network node connected to the network, an input or output end of a plane on the network, or a server which is a destination for a packet on the network.

The network monitoring device may be provided as two or more network monitoring devices operating in the network.

The network switch may be configured to mirror a packet at any one of an OSI layer 2, an OSI layer 3, an OSI layer 4, or an OSI layer 7.

The security packet may be generated when it is determined that a security problem has occurred on the client terminal based on at least one of the following: monitoring system log files of the terminal; determining an attempt to access the terminal from an IP not included in a whitelist of permitted IPs; analyzing packet information regarding the terminal; analyzing status information of the terminal; and obtaining alive information indicating a connectivity status of the terminal.

The performing of the security monitoring on the network may include utilizing a packet analysis algorithm corresponding to at least one protocol of HTTP, IP, UDP, TCP, and DNS, and the packet analysis algorithm may be configured to analyze the mirroring packet by adaptively extracting at least one of a URL, a source IP, a destination IP, and time information from the mirroring packet according to the at least one protocol, and configured to determine at least one of the following based on the mirroring packet: a user experience delay time on a terminal, traffic up to a first server through the Internet, a latency in each server segment, a web latency, an app latency, a latency between servers, a latency for each server, a number of latency sessions (waits) for each server, an index for each application URI, and an index for each DB query of a server.

The network monitoring method may further include visualizing and displaying results of the security monitoring of the network, and the visualizing may be visualizing statistics of at least one indicator related to current network performance using at least one visualization method among creation of a meaningful graph, creation of a table, and creation of a flow map.

A network monitoring device for monitoring a client terminal according to an aspect of the present disclosure is configured to perform security monitoring on the client terminal to generate monitoring result information; based on a result of the security monitoring, generate a security check packet containing user ID (UID) information of the client terminal, length information, and monitoring result information; and transmit the security check packet over a network.

The network monitoring device may be configured to generate the security packet when it is determined that the security problem has occurred on the client terminal based on at least one of the following: monitoring system log files of the terminal; determining an attempt to access the terminal from an IP not included in a whitelist of permitted IPs; analyzing packet information regarding the terminal; analyzing status information of the terminal, and obtaining alive information indicating a connectivity status of the terminal.

The security check packet may be a TCP packet format that contains at least a TCP header and a TCP payload, and the TCP payload may contain field information of at least one of a UID field, a length field, and a monitoring result field.

The security check packet may be a UDP packet format that contains at least a UDP header and a UDP payload, and the UDP payload may contain field information of at least one of a UID field, a length field, and a monitoring result field.

The network monitoring device may be integrated into the client terminal.

A network monitoring device for monitoring packets on a network according to an aspect of the present disclosure is configured to: obtain a security check packet transmitted from a client monitoring device that monitors the client terminal; obtain a mirroring packet from a network switch device that mirrors packets; and perform security monitoring of the network by analyzing at least one of the security check packet and the mirroring packet. The network monitoring device may be configured to be assigned an IP address on the network and receive the security check packet as a TCP packet based on the IP address.

The network monitoring device may be configured to obtain the security check packet as a UDP packet by monitoring packets on a path on the network, without being assigned an IP address on the network.

The network monitoring device may include a packet analysis algorithm corresponding to at least one protocol among HTTP, IP, UDP, TCP, and DNS, and the packet analysis algorithm may be configured to analyze the mirrored packet by adaptively extracting at least one of a URL, a source IP, a destination IP, and time information from the mirrored packet according to the at least one protocol, and configured to determine at least one of the following based on the mirrored packet: a user experience delay time on a terminal, traffic up to a first server through the Internet, a latency in each server segment, a web latency, an app latency, a latency between servers, a latency for each server, a number of latency sessions (waits) for each server, an index for each application URI, and an index for each DB query of a server.

The network monitoring device may be connected to a service module that visualizes a security monitoring result for the network by the network monitoring device, and the service module may be configured to visualize statistics of at least one indicator related to current network performance using at least one visualization method among creation of a meaningful graph, creation of a table, and creation of a flow map.

The network monitoring device may be located and operating in at least one of the following: a standalone network node connected to the network, an input or output end of a plane on the network, or a server which is a destination for a packet on the network.

The network monitoring device may be provided as two or more network monitoring devices operating in the network.

According to the present disclosure, it is possible to monitor not only the security and performance of a terminal itself but also the security and performance of a network to which the terminal connects, and it is also possible to ensure visibility and clarity across the entire network area, enabling proactive management (prevention) of security and performance issues in network services.

BRIEF DESCRIPTION OF THE DRAWING

FIG. 9 is a view showing examples of a 5G usage scenario to which technical features of the present disclosure may be applied.

DETAILED DESCRIPTION

Figure 1:
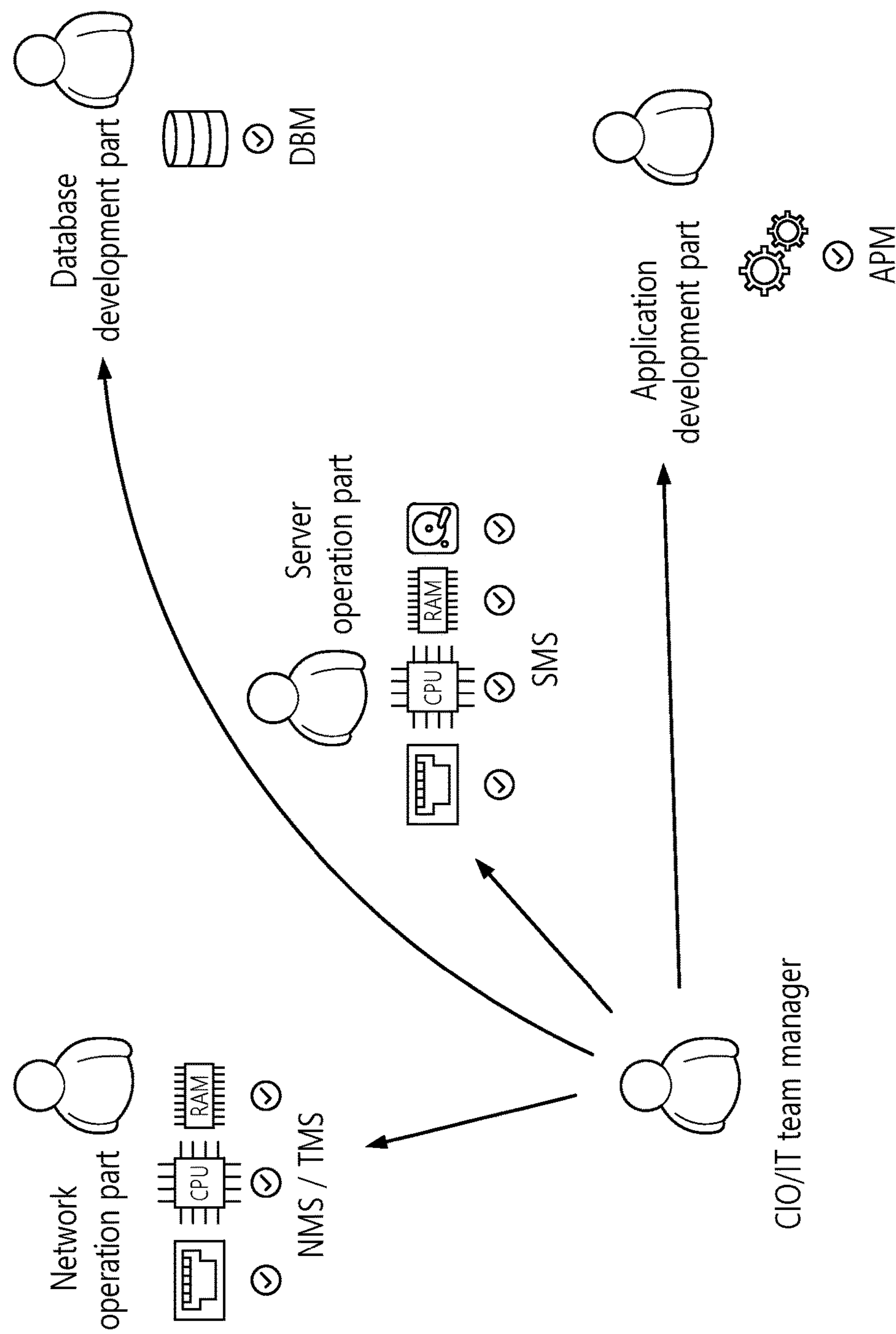
FIG. 1 is a conceptual diagram for explaining a conventional process for performing network service management.

The present disclosure may be modified in various ways and may have various embodiments, and specific embodiments will be illustrated in the drawings and described in detail.

It is however to be understood that the present disclosure is not intended to be limited to the specific embodiments, but includes all modifications, equivalents and/or substitutions which fall within the spirit and technological scope of the present disclosure.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present disclosure, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening there between. In contrast, it should be understood that when an element is referred to as being "directly coupled" or "directly connected" to another element, there are no intervening elements present.

The terms used in the present specification are merely used to describe particular embodiments, and are not intended to limit the present disclosure. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added.

In other words, when a specific element is referred to as being "included", elements other than the corresponding element are not excluded, but additional elements may be included in embodiments of the present disclosure or the scope of the present disclosure. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferred embodiments of the present disclosure will be described in more detail with reference to the attached drawings. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As more and more communication devices require more communication capacity, there is a need for improved mobile broadband communication over existing radio access technology. Also, massive machine type communications (MTC), which provide various services by connecting many devices and objects, are one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultra-reliable and low latency communication (URLLC) is discussed, and this new technology may be called new radio access technology (new RAT or NR) in the present disclosure for convenience.

In particular, devices in a 5G communication network operate on the assumption that, in the 5G communication network, communication between devices takes place within the bounds of performance, and thus, it is very important to quickly find out how fast communication between devices is taking place, and, if the communication does not flow smoothly, what the cause of the performance degradation is. However, this problem is not being dealt with properly because there is no proper service for finding the exact cause of such performance degradation. As a result, the issue of performance degradation is not handled properly, and performance improvements cannot be achieved at the right timing, thereby causing difficulties in overall system operation.

Throughout this specification, the term "entity" refers to various types of devices associated with a network, which include a terminal (also referred to as "client terminal") and/or a server device. In an IoT environment, the terminal may be called an IoT device.

A user basically means a user of a terminal. In some cases, however, the user may mean a user of a network monitoring device according to an embodiment of the present disclosure. A network administrator and/or a network manager is a person who manages a network related to the network monitoring device, which may mean the user of the network monitoring device. Hereinafter, the network monitoring device is a device that calculates security and performance-related indicators of a network, which also may be called a packet mirroring device. Also, the network monitoring device may be called a network monitoring visualization device since it can be implemented as a device that visualizes the security and performance-related indicators of a network service.

The network monitoring device may be present as an independent device or provided as one function implemented by another entity within the network. In this case, the network monitoring device may be called a network monitoring function (hereinafter, "NMF"). Accordingly, an NMF that monitors packets coming into or out of the server may be called a network server monitoring function (NMSF), and an NMF that monitors the terminal (or client terminal) may be called a network client monitoring function (NMCF).

Hereinafter, the term "network security and performance" may be collectively used in relation to the security and performance of communication in a server, a communication network, and a client.

LTE and 5G-Based Communication System

Figure 2:
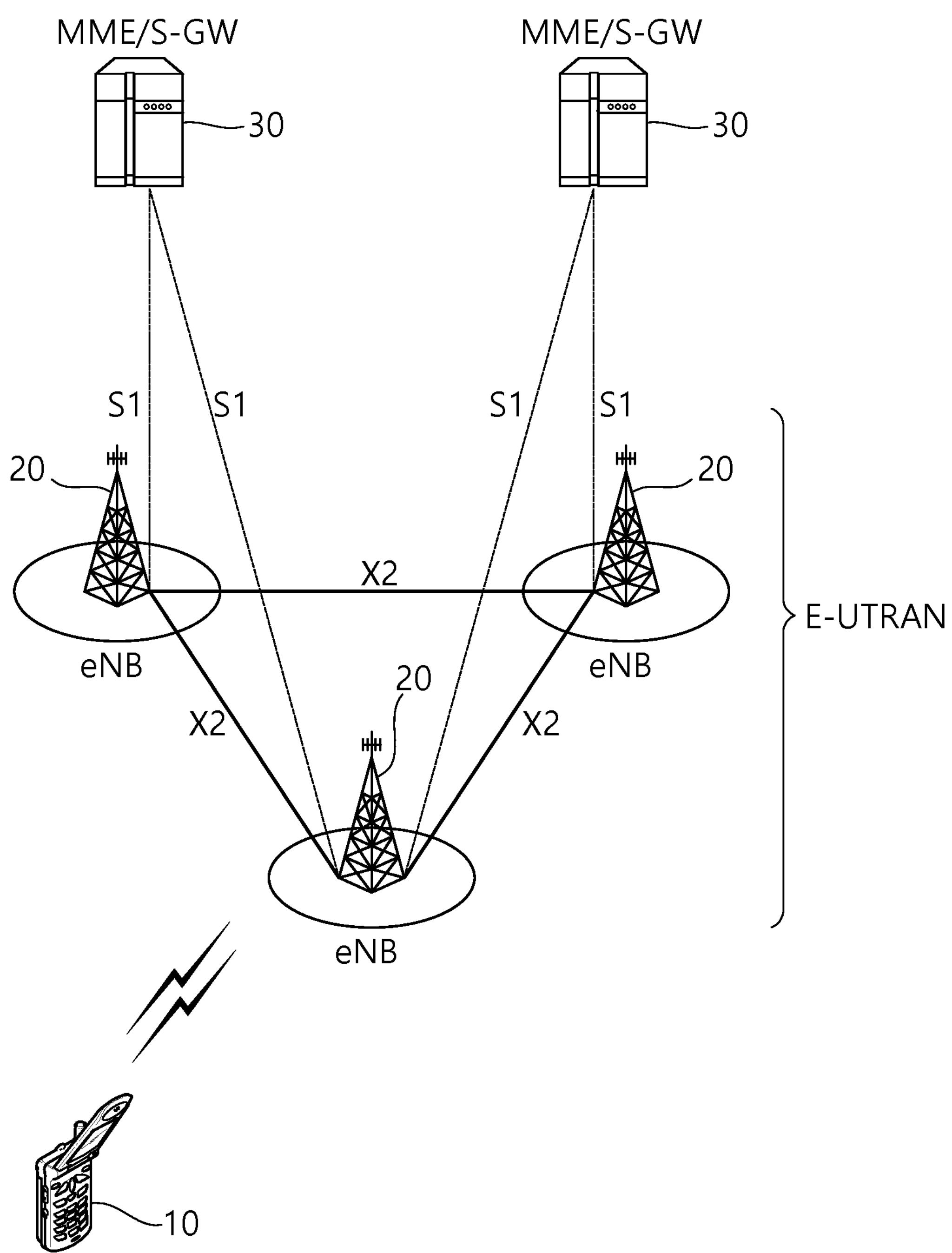
FIG. 2 is a conceptual diagram illustrating a wireless communication system to which the present disclosure may be applied.

FIG. 2 illustrates a wireless communication system to which the present disclosure may be applied. It also may be referred to as E-UTRAN (Evolved-UMTS Terrestrial Radio Access Network) or an LTE (Long Term Evolution)/LTE-A system.

E-UTRAN includes a base station (BS) 20 which provides a control plane and a user plane to a user equipment (UE) 10. The UE 10 may be fixed or mobile and also called a mobile station (MS), a user equipment (UT), a subscriber station (SS), a mobile terminal (MT), a wireless device, a station (STA), or the like. The base station 20 refers to a fixed station communicating with the UE 10 and may also be called an evolved-NodeB (eNB), a base transceiver system (BTS), an access point, or the like.

Base stations 20 may be connected to each other through an X2 interface. The base station 20 is connected to an evolved packet core (EPC) 30 through an S1 interface, more specifically, to a mobility management entity (MME) through S1-MME and to a serving gateway (S-GW) through S1-U.

The EPC 30 is composed of an MME, an S-GW, and a packet data network gateway (P-GW). The MME has access information of UEs or information related to UE capability, and such information is mainly used for UE mobility management. The S-GW is a gateway having E-UTRAN as an end point and the P-GW is a gateway having PDN as an end point.

Layers of a radio interface protocol between the UE and a network may be classified into an L1 (first layer), an L2 (second layer), and an L3 (third layer) based three lower layers of an open system interconnection (OSI) reference model which is widely known in a communication system and, among them, a physical layer that belongs to the first layer provides an information transfer service using a physical channel and a radio resource control (RRC) layer positioned on the third layer serves to control radio resources between the UE and the network. To this end, the RRC layer exchanges an RRC message between the UE and the base station.

Figure 3:
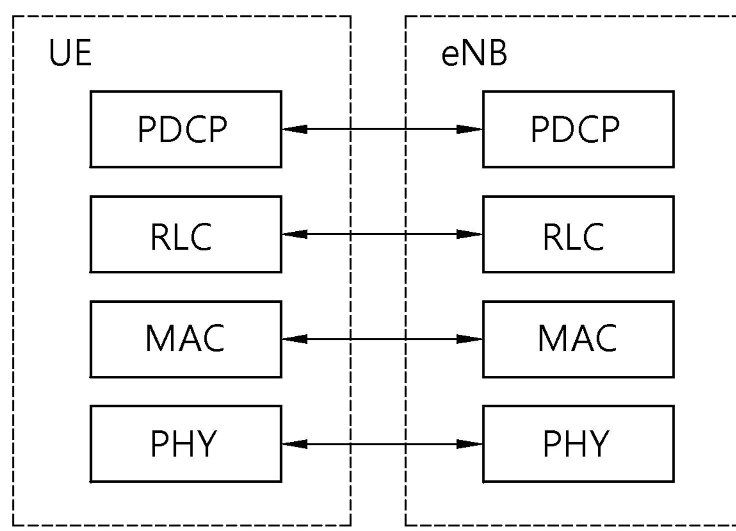
FIG. 3 is a block diagram showing a radio protocol architecture for a user plane.
Figure 4:
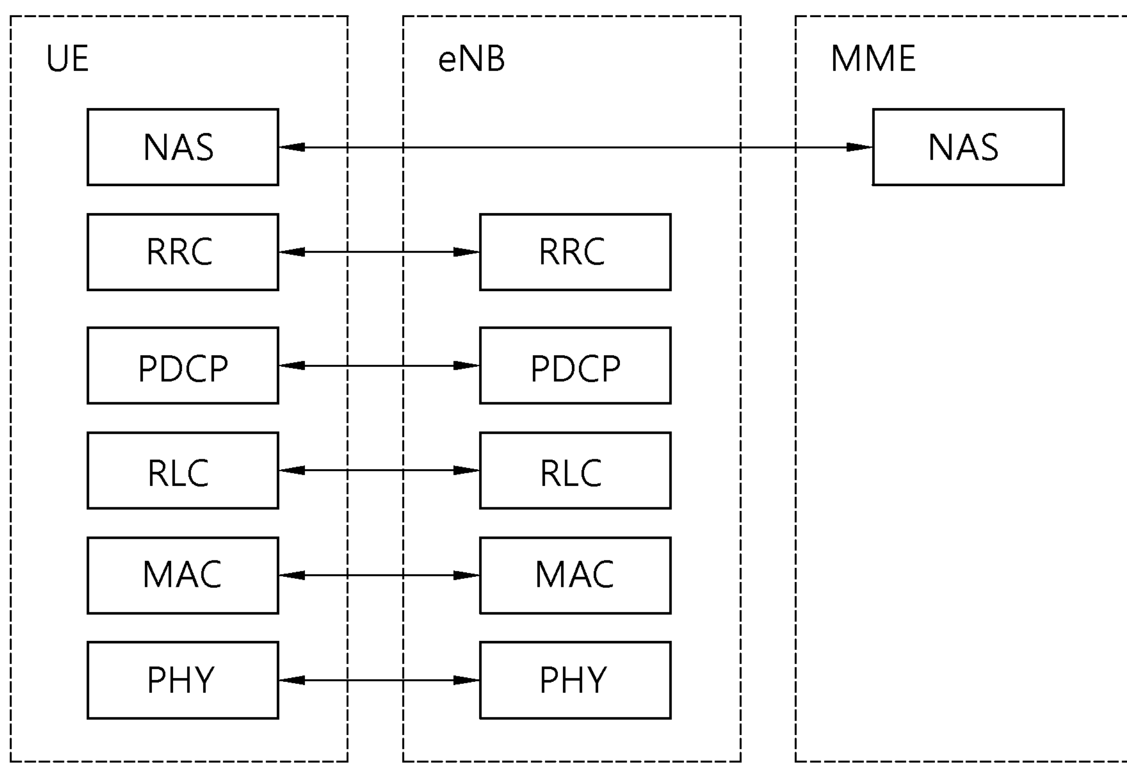
FIG. 4 is a block diagram showing a radio protocol architecture for a control plane

FIG. 3 is a block diagram showing a radio protocol architecture for a user plane, and FIG. 4 is a block diagram showing a radio protocol architecture for a control plane. The user plane is a protocol stack for user data transmission, and the control plane is a protocol stack for transmitting a control signal.

Referring to FIGS. 3 and 4, a physical (PHY) layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data is transferred through the physical channel. The physical channel is modulated using an orthogonal frequency division multiplexing (OFDM) scheme, and utilizes time and frequency as a radio resource.

Functions of the MAC layer include mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

Functions of the RLC layer include RLC SDU concatenation, segmentation, and reassembly. To ensure a variety of quality of service (QOS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

A radio resource control (RRC) layer is defined only in the control plane. The RRC layer serves to control the logical channel, the transport channel, and the physical channel in relation to configuration, reconfiguration and release of radio bearers (RBs). An RB means a logical path provided by the first layer (i.e., the PHY layer) and the second layer (i.e., the MAC layer, the RLC layer, and the PDCP layer) for data delivery between the UE and the network.

Functions of a packet data convergence protocol (PDCP) layer in the user plane include user data delivery, header compression, and ciphering. Functions of the packet data convergence protocol (PDCP) layer in the control plane include control-plane data delivery and ciphering/integrity protection.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state, and otherwise the UE is in an RRC idle state.

Examples of a downlink transport channel through which data is transmitted from the network to the UE include a broadcast channel (BCH) for transmitting system information and a downlink-shared channel (SCH) for transmitting user traffic or control messages. A traffic or control message of downlink multicast or broadcast services or the control messages may be transmitted on the downlink-SCH or an additional downlink multicast channel (MCH). Examples of an uplink transport channel through which data is transmitted from the UE to the network include a random access channel (RACH) for transmitting an initial control message and an uplink shared channel (SCH) for transmitting user traffic or control messages.

Logical channels that are placed over the transport channel and that are mapped to the transport channel include a broadcast control channel (BCCH), a paging control channel (PCCH), a common control channel (CCCH), a multicast control channel (MCCH), a multicast traffic channel (MTCH), etc.

The physical channel includes several OFDM symbols in the time domain and several subcarriers in the frequency domain. One subframe includes a plurality of OFDM symbols in the time domain. A resource block is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Hereinafter, a new radio access technology (new RAT or NR; also referred to as "5G") will be described.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next-generation RAT, which takes into account such enhanced mobile broadband communication, massive MTC (mMCT), and ultra-reliable and low latency communication (URLLC), is being discussed. In the present disclosure, for simplicity, this technology will be referred to as new RAT, NR (NEW RADIO), or 5G communication.

Figure 5:
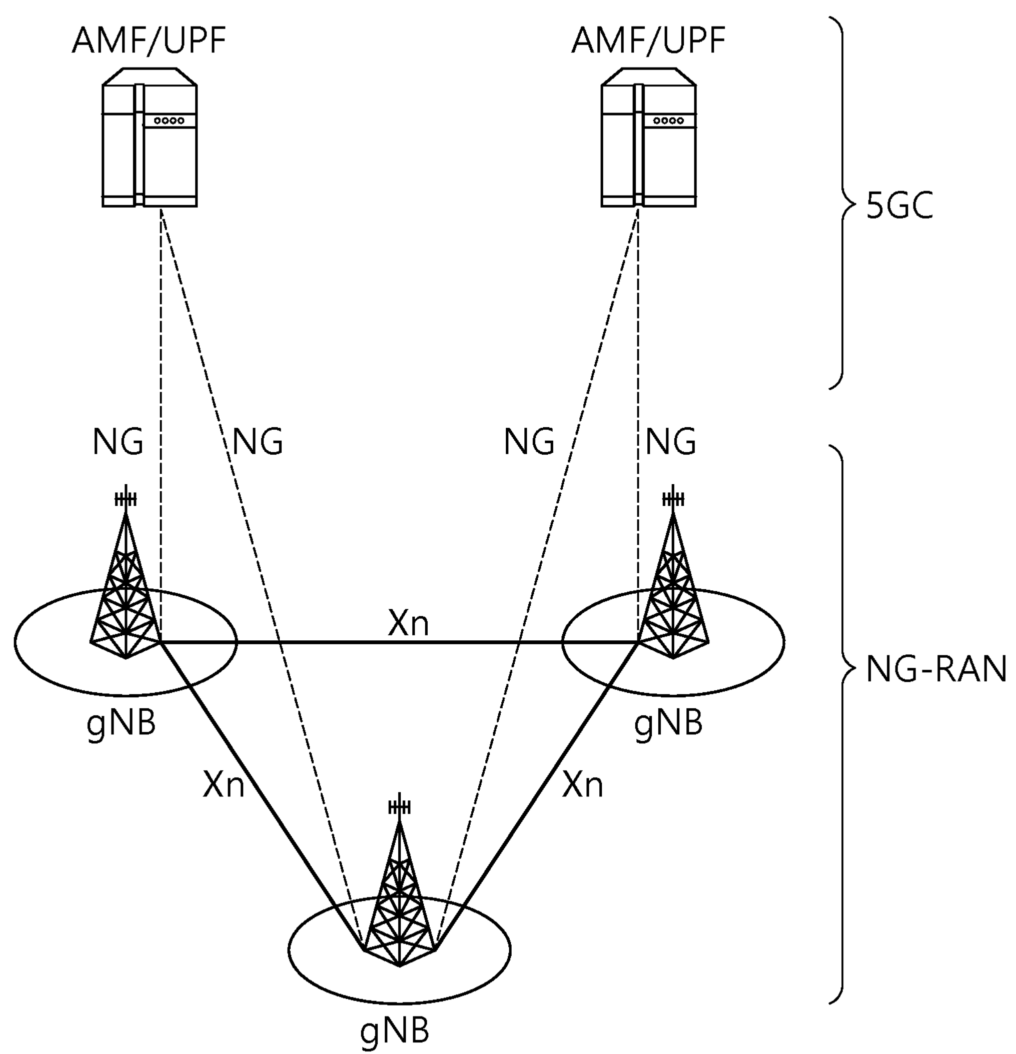
FIG. 5 is a conceptual diagram illustrating a system structure of a next generation radio access network (NG-RAN) to which NR is applied.

FIG. 5 illustrates a system structure of a new generation radio access network (NG-RAN) to which the NR is applied.

Referring to FIG. 5, the NG-RAN may include a gNB and/or an eNB providing user plane and control plane protocol terminations to a UE. FIG. 4 illustrates a case where only the gNB is included. The gNB and the eNB are connected to each other via an Xn interface. The gNB and eNB are connected to a 5G core network (5GC) via an NG interface. More specifically, the gNB and the eNB are connected to an access and mobility management functions (AMF) via an NG-C interface, and connected to a user plane function (UPF) via an NG-U interface.

Figure 6:
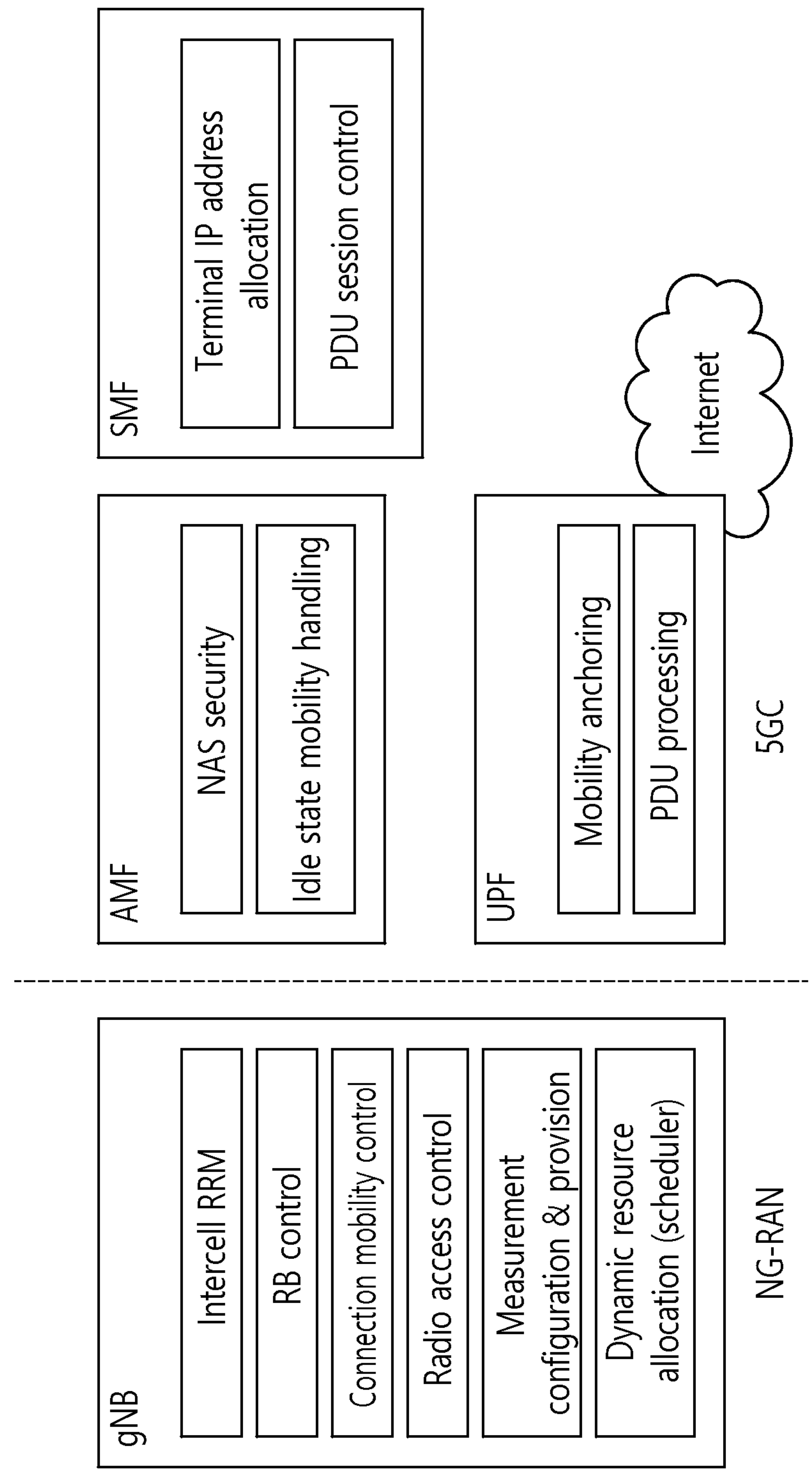
FIG. 6 is a block diagram illustrating functional split between NG-RAN and 5GC.

FIG. 6 illustrates functional split between NG-RAN and 5GC.

Referring to FIG. 6, the gNB may provide functionality such as inter-cell radio resource management (RRM), radio bearer (RB) control, connection mobility control, radio access control, measurement configuration & provision, dynamic resource allocation, and the like. The AMF may provide functionality such as non-access stratum (NAS) security and idle state mobility handling. The UPF may provide functionality such as mobility anchoring and protocol data unit (PDU) processing. A Session Management Function (SMF) may provide functions such as terminal IP address allocation and PDU session control.

Figure 7:
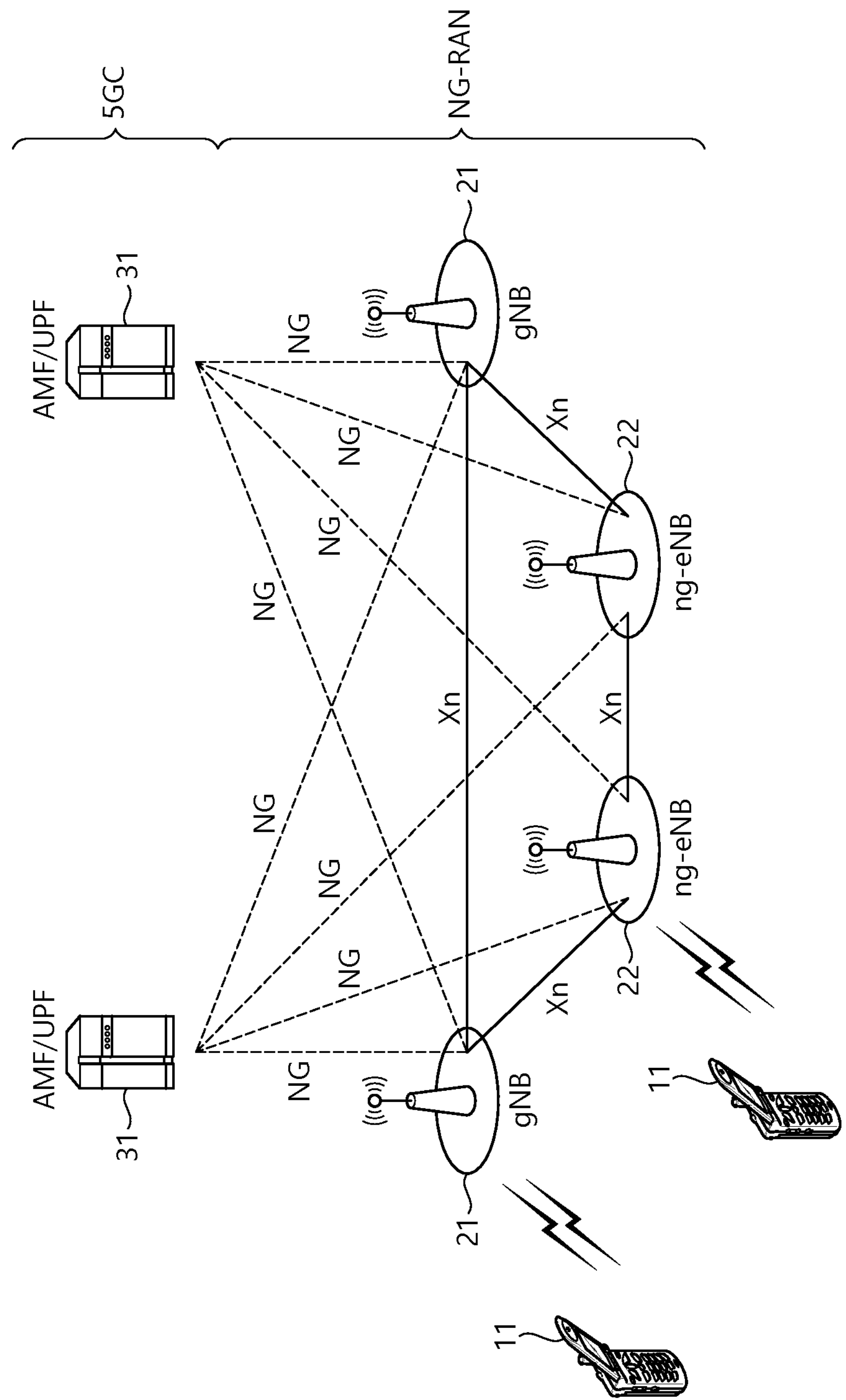
FIG. 7 is a view showing another example of a wireless communication system to which technical features of the present disclosure may be applied.

FIG. 7 is a view showing another example of a wireless communication system to which technical features of the present disclosure may be applied. Specifically, FIG. 7 shows a system architecture based on a 5G new radio access technology (NR) system. The entity used in the 5G NR system (hereinafter, simply referred to as "NR") may absorb some or all of the functions of the entities introduced in FIG. 2 (e.g., eNB, MME, S-GW). The entity used in the NR system may be identified by the name "NG" for distinction from the LTE.

In the following description, for NR, 3GPP TS 38 series (3GPP TS 38.211, 38.212, 38.213, 38.214, 38.331, etc.) may be referred to in order to facilitate understanding of the following description.

Referring to FIG. 7, the wireless communication system includes one or more UE 11, a next-generation RAN (NG-RAN), and a 5th generation core network (5GC). The NG-RAN consists of at least one NG-RAN node. The NG-RAN node is an entity corresponding to the BS 20 shown in FIG. 2. The NG-RAN node is composed of at least one gNB 21 and/or at least one ng-eNB 22. The gNB 21 provides NR user plane and control plane protocol terminations towards the UE 11. The Ng-eNB 22 provides E-UTRA user plane and control plane protocol terminations towards the UE 11.

The 5GC includes an access and mobility management function (AMF), a user plane function (UPF) and a session management function (SMF). The AMF hosts functions, such as NAS security, idle state mobility handling, etc. The AMF is an entity including the functions of the conventional MME. The UPF hosts functions, such as mobility anchoring, protocol data unit (PDU) handling. The UPF an entity including the functions of the conventional S-GW. The SMF hosts functions, such as UE IP address allocation, PDU session control.

The gNB and the ng-eNB are connected together via an Xn interface. The gNB and the ng-eNB are also connected via an NG interfaces to the 5GC. More specifically, the gNB and the ng-eNB are connected to the AMF via an NG-C interface and to the UPF via an NG-U interface.

Figure 8:
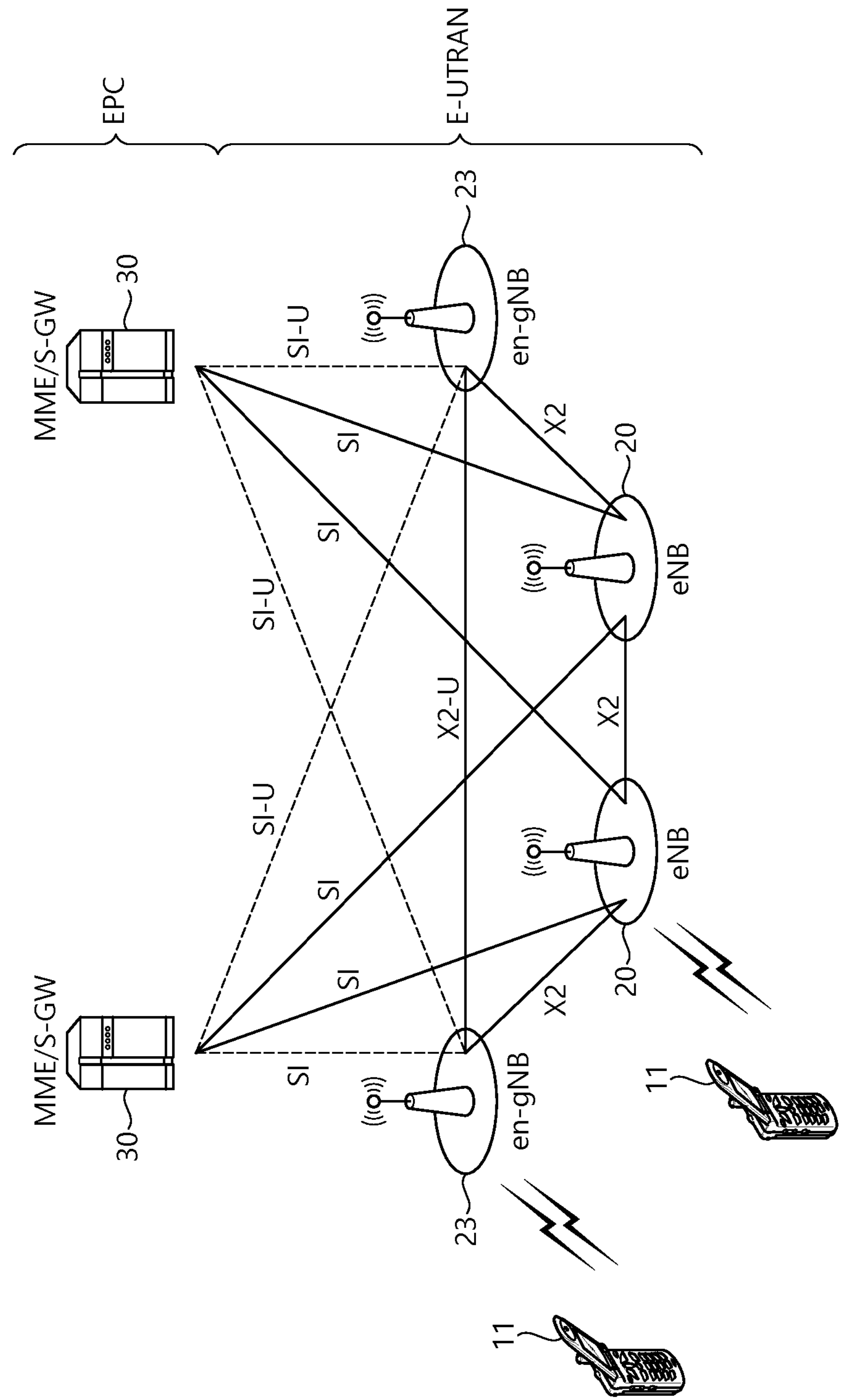
FIG. 8 is a view showing yet another example of a wireless communication system to which technical features of the present disclosure may be applied.

FIG. 8 is a view showing yet another example of a wireless communication system to which technical features of the present disclosure may be applied. Specifically, FIG. 8 shows a system architecture based on an LTE system. The entity used in the NR may absorb some or all of the functions of the entities introduced in FIG. 5 (e.g., gNB, AMF, UPF). The entity used in the LTE system may be identified by the name "EN" for distinction from the NR.

Referring to FIG. 8, the wireless communication system includes one or more UE 11, an E-UTRABN, and an EPC. The E-UTRAN consists of at least one E-UTRAN node. The E-UTRAN node is an entity corresponding to the BS 20 shown in FIG. 2. The E-UTRAN node consists of at least one en-gNB 23 and/or at least one eNB 20. The en-gNB 23 provides NR user plane and control plane protocol terminations towards the UE 11. The eNB 20 provides E-UTRA user plane and control plane protocol terminations towards the UE 11.

The EPC includes an MME and a S-GW. The en-gNB and the eNB are connected together via an X2 interface. The en-gNB and the eNB are connected to the EPC via an S1 interface NG. More specifically, the en-gNB and the eNB are connected to the MME and/or the S-GW via an S1-U and/or S1 interface.

FIG. 9 is a view showing examples of a 5G usage scenario to which technical features of the present disclosure may be applied. The 5G usage scenarios shown in FIG. 9 are only exemplary, and the technical features of the present disclosure can be applied to other 5G usage scenarios which are not shown in FIG. 9.

Referring to FIG. 9, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization, and other use cases may only focus on only one key performance indicator (KPI). 5G is to support these various use cases in a flexible and reliable way. 5G supports these diverse use cases in a flexible and reliable way.

eMBB focuses on across-the-board enhancements to data rate, latency, user density, and mobile broadband access capacity and coverage. eMBB aims at a throughput of about 10 Gbps. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video, and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are other key factors that increase the demand for mobile broadband capabilities. Entertainment is essential in smartphones and tablets anywhere, including high mobility environments such as trains, cars, and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims at about 10-year-lifespan batteries and/or about million devices per square kilometer (1 km2). mMTC allows seamless integration of embedded sensors in all areas, and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture, and security infrastructures.

URLLC will make it possible for devices and machines to communicate with ultra-reliability, very low latency and high availability, making it ideal for vehicular communication, industrial control, factory automation, remote surgery, smart grids, and public safety applications. URLLC aims at a latency of 1 ms. URLLC includes new services that will change the industry through links with ultra-reliability/low latency, such as remote control of key infrastructure and self-driving vehicles. The level of reliability and latency is essential for smart grid control, industrial automation, robotics, drone control, and coordination.

Next, a plurality of use cases included in the triangle of FIG. 9 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

The automotive industry is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian).

The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and the infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows, and heating controllers, burglar alarms, and appliances are all wirelessly connected. Many of these sensors typically require low data rate, low power, and low cost. However, for example, real-time high-definition (HD) video may be required for certain types of devices for monitoring.

<Artificial Intelligence (AI)>

Artificial Intelligence (AI) refers to AI itself or the field for studying how to build AI, and machine learning refers to the field for defining problems related to AI and studying how to tackle the problems. Machine learning is also defined as an algorithm that constantly performs a specific task to improve performance related to the task.

An Artificial Neural Network (ANN) is a model used in machine learning and may refer to entire models consisting of artificial neurons (nodes) forming a network through combination of synapses to solve problems. The ANN may be defined by a connection pattern between neurons on different layers, a learning procedure for updating a model parameter, and an activation function for generating an output value.

The artificial neural network may include an input layer, an output layer, and selectively one or more hidden layers. Each layer may include one or more neurons, and the artificial neural network may include a synapse connecting one neuron to another neuron. In the artificial neural network, each neuron is able to output a value of an activation function with respect to input signals input through a synapse, weight, and bias.

A model parameter refers to a parameter to be decided through learning, and the model parameter includes a weight of synapse connection, bias in a neuron, etc. In addition, a hyperparameter refers to a parameter to be set in a machine learning algorithm before a learning process begins, and the hyperparameter includes a learning rate, the number of repetition, a mini-batch size, an initialization function, etc.

The purpose of training an artificial neural network may be to determine a model parameter that minimizes a loss function. The loss function may be used as an indicator for determining an optimal model parameter in a process of training the artificial neural network.

Machine learning may be classified into supervised learning, unsupervised learning, and reinforcement learning according to a learning method.

The supervised learning may refer to a method for training an artificial neural network with a given label for training data, and a label may refer to an answer (or a result) that an artificial neural network needs to infer when training data is input to the artificial neural network. The unsupervised learning may refer to a method for training an artificial neural network without a given label for training data. The reinforcement learning may refer to a learning method for performing training an agent defined in a certain environment to select an action or action sequence that maximizes accumulative compensation.

Machine learning implemented as a Deep Neural Network (DNN) including a plurality of hidden layers among artificial neural networks may be referred to as deep learning, and deep learning is part of machine learning. Hereinafter, machine learning is used to include deep learning.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving or Autonomous-Driving>

Self-driving or autonomous-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), ahead-up display (HUD), a mobile phone, a tablet PC, a laptop, a desktop, a TV, a digital signage, and the like. A device to which the XR technology is applied may be referred to as an XR device.

Security Monitoring in Wireless Network

A wireless network according to this embodiment may be configured by a network security architecture. The network security architecture may include at least one network monitoring function (NMF). Here, the NMF may be implemented by a deep packet inspection (DPI) function deployed by a network or a dedicated DPI network node. The NMF may be classified as an NMSF or an NMCF depending on a node where the function thereof is located. In other words, the NMSF may be a type of server as a network node or may also be implemented as a module or function within another server. The NMCF may itself be a type of terminal or IoT device or may be implemented in the form of a module or function within another terminal or IoT device. For example, the NMCF may be stored as software in a chip or memory of a terminal, and may perform an operation of monitoring the security or performance of the terminal (or client node). This network security architecture including the NMSF and the NMCF may apply to various networks such as LTE, 5G, and 5G NPN disclosed in this specification.

For network security and performance monitoring, an entity within the radio access network (RAN) or an entity within the core network may be provided with an NMSF, and a terminal may be provided with an NMCF. Also, a specific protocol may be defined between the NMSF and the NMCF to send and receive signals related to performance or security. That is, once an NMSF and an NMCF is provided in a network, the network administrator may monitor various problems with security and performance that occur on a communication path between network nodes and end terminals, and accordingly a variety of services (i.e., 5G URLLC services) provided based on the type of the network may be efficiently provided. In addition, if an NMCF is provided, active RTT measurement is possible. The active RTT measurement refers to a method of forcibly transmitting a packet to connect to the network for RTT measurement. In other words, an NMCF actively transmits a packet for RTT measurement periodically or aperiodically, allowing the NMSF to calculate an RTT based on the packet.

Meanwhile, there are two scenarios in which the network security architecture according to this embodiment is applied to a network. The first scenario is about a network that provides relatively open services, and the second scenario is about a network that provides highly closed network-connect-oriented services, such as a disaster network. In any scenario, the NMCF may be integrated into terminals connected to a network and monitor the security of the terminal, and the NMSF may exist as a separate node within the network and mirrors packets, flowing on the network path, through L3 switching to ensure network security.

However, in the first scenario, the NMSF is assigned an IP and can directly connect to the network, so the NMCF and NMSF can directly exchange security-related information, whereas in the second scenario, the NMSF is an external device not assigned an IP and is thereby not allowed to connect directly to the network. Therefore, in the second scenario, the NMSF cannot directly a receive security-related packet from the NMCF and cannot directly give a security-related instruction to the NMCF.

Figure 10:
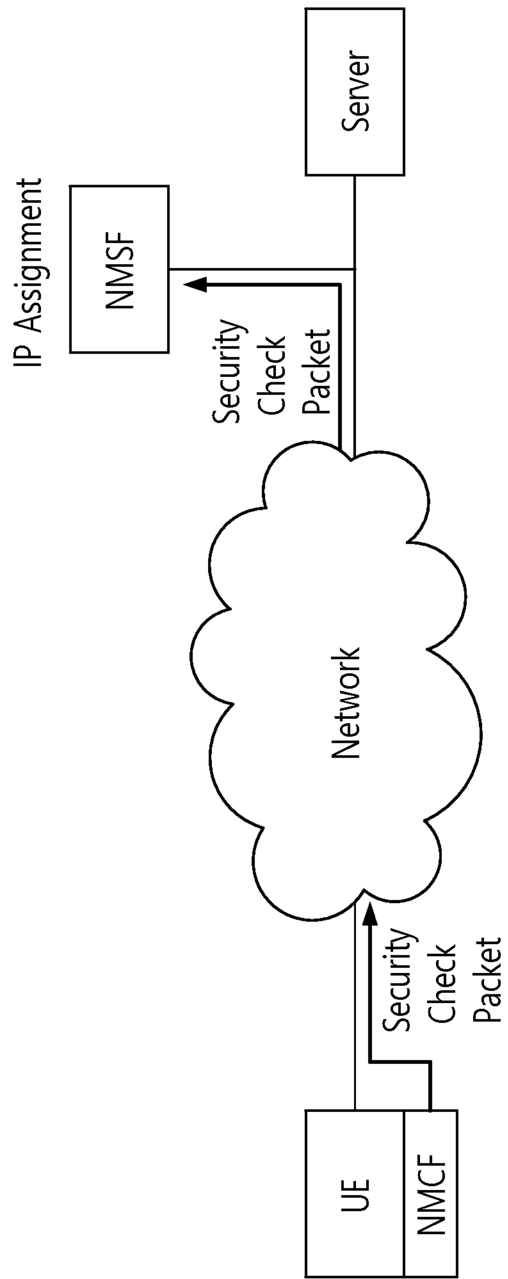
FIG. 10 is a diagram illustrating a method for performing network security monitoring based on a security check packet according to an embodiment according to a first scenario.

FIG. 10 is a diagram illustrating a method for performing network security monitoring based on a security check packet according to an embodiment according to a first scenario.

Referring to FIG. 10, a terminal with an integrated NMCF performs security monitoring of the terminal, generates a security check packet indicating a security monitoring result, and transmits the security check packet to a network. Here, since the NMSF is assigned its own IP, a destination for the security packet within the network may be the NMSF. That is, the NMSF may receive the security check packet directly from the NMCF.

The security monitoring of the terminal may include, for example, at least one of the following: monitoring system log files of the terminal; determining an attempt to access the terminal from an IP not included in a whitelist of permitted IPs; analyzing packet information regarding the terminal; analyzing status information of the terminal; and obtaining alive information indicating a connectivity status of the terminal.

For example, monitoring the system log file of the terminal may include a process of determining that a security problem has occurred when there is a login attempt to the terminal from an unpermitted IP.

In another example, monitoring the system log files of the terminal may include a process of determining that a security problem has occurred when there is an unknown process in the terminal.

In yet another example, monitoring the system log files of the terminal may include a process of determining that a security problem has occurred when there is a predetermined number of login failures or more during a predetermined time period in the terminal.

In yet another example, analyzing the status information of the terminal may include a process of determining that a security problem has occurred when internal information of the terminal is greater than a preset threshold value. Here, the internal information may be, for example, CPU usage or memory usage of the terminal.

In yet another example, analyzing the status information of the terminal may include a process of determining that a security problem has occurred when there is an event of connection or disconnection of additional media to the terminal.

In yet another example, obtaining the alive information may include a process of determining that a security problem has occurred based on at least one of the following: a determination of the inability to access the terminal beyond a pre-defined time threshold, and a determination of the absence of a device IP in an Address Resolution Protocol (ARP).

When it is determined that a security problem has occurred as above, the terminal (or NMCF) generates a security check packet indicating the security monitoring result.

The security check packet may be generated and transmitted periodically or aperiodically.

Figure 11:
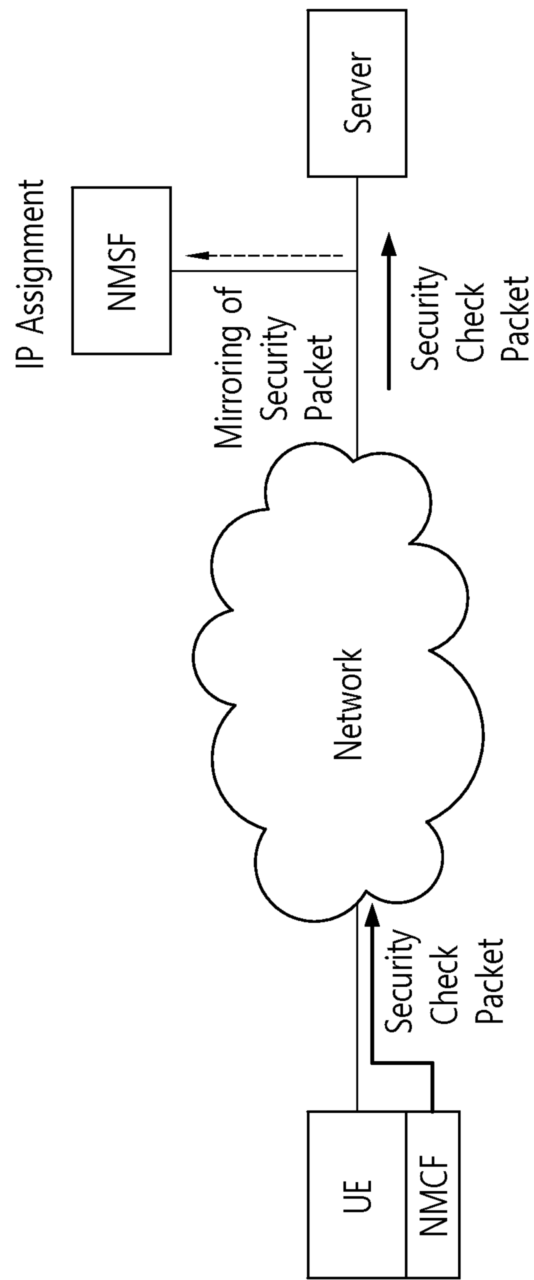
FIG. 11 is a security packet structure according to a first scenario.

FIG. 11 is a security packet structure according to a first scenario.

Referring to FIG. 11, a security check packet is a TCP packet format and includes a TCP header and a TCP payload. The TCP payload may include a user ID (UID) field, a length field, and a monitoring result field. For example, the UID field, the length field, and the monitoring result field may be defined as shown in Table 1 below.

TABLE 1

| Field | Byte length | Description |
|---|---|---|
| UID | 4 | This field indicates a user ID of UE |
| Length | 2 | This field indicates the byte length of the monitoring result field |
| Monitoring Result | Variable | This field indicates alive information, CPU usage and memory usage of UE |

Referring to Table 1, the UID field, comprising 4 bytes, indicates user ID or identification information of the terminal; the length field, comprising 2 bytes, indicates a byte length of the monitoring result field following the length field; and the monitoring result field indicates the security monitoring result of the terminal, such as alive information, CPU usage, memory usage, etc. Referring again to FIG. 10, the NMSF, which has received the security check packet from the NMCF, may check the security monitoring result of the terminal based on the security check packet, and perform RTT measurement for segments (including wireless segment and network segment) through which the security check packet has passed. In other words, the security check packet not only provide the security monitoring result of the terminal, but also may be used to perform security monitoring of the network segment as an intermediate packet of the active RTT measurement.

Specifically, the NMCF attempts a TCP connection using a 3-way handshaking procedure for transmitting a security check packet and transmits the security check packet to the NMSF. The NMSF performs RTT measurement using a 3-way handshaking procedure for transmitting a security check packet. In an environment where information regarding the period or time at which the security check packet is transmitted is pre-agreed upon between the NMSF and the NMCF, the NMSF may perform RTT measurement at each specified period or time. In other words, the NMSF is aware in advance of at least the interval or time at which the NMCF will transmit the security check packet, and perform RTT measurement based on the 3-way handshake procedure for transmitting a security check packet. At this time, the NMSF may perform RTT measurement by mirroring signals exchanged in the 3-way handshaking procedure.

Then, the NMSF may receive the data portion of the security check packet with the TCP header removed, identify from which terminal (or NMCF) the security check packet is sent based on the UID, decrypt the monitoring result field based on a specific length indicated by the length field, and determine whether a security problem has occurred on the terminal based on the decrypted monitoring result field.

Figure 12:
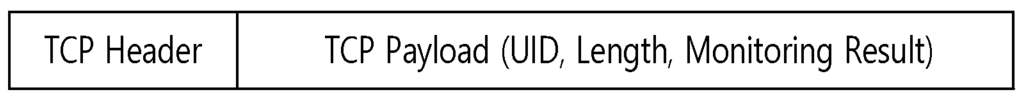
FIG. 12 is a diagram illustrating a method of performing network security monitoring based on a security check packet according to an embodiment according to a second scenario.

FIG. 12 is a diagram illustrating a method of performing network security monitoring based on a security check packet according to an embodiment according to a second scenario.

Referring to FIG. 12, a terminal with an integrated NMCF performs security monitoring of the terminal, generates a security check packet indicating a security monitoring result, and transmits the security check packet to a network. Here, since an NMSF has not been assigned its own IP, a destination for the security packet within the network may be a server other than the NMSF. That is, the NMSF cannot receive the security check packet directly from the NMCF.

The security monitoring of the terminal may include, for example, at least one of the following: monitoring system log files of the terminal; determining an attempt to access the terminal from an IP not included in a whitelist of permitted IPs; analyzing packet information regarding the terminal; analyzing status information of the terminal; and obtaining alive information indicating a connectivity status of the terminal.

For example, monitoring the system log file of the terminal may include a process of determining that a security problem has occurred when there is a login attempt to the terminal from an unpermitted IP.

In another example, monitoring the system log files of the terminal may include a process of determining that a security problem has occurred when there is an unknown process in the terminal.

In yet another example, monitoring the system log files of the terminal may include a process of determining that a security problem has occurred when there is a predetermined number of login failures or more during a predetermined time period in the terminal.

In yet another example, analyzing the status information of the terminal may include a process of determining that a security problem has occurred when internal information of the terminal is greater than a preset threshold value. Here, the internal information may be, for example, CPU usage or memory usage of the terminal.

In yet another example, analyzing the status information of the terminal may include a process of determining that a security problem has occurred when there is an event of connection or disconnection of additional media to the terminal.

In yet another example, obtaining the alive information may include a process of determining that a security problem has occurred based on at least one of the following: a determination of the inability to access the terminal beyond a pre-defined time threshold, and a determination of the absence of a device IP in an Address Resolution Protocol (ARP).

When it is determined that a security problem has occurred as above, the terminal (or NMCF) generates a security check packet indicating the security monitoring result.

The security check packet may be generated and transmitted periodically or aperiodically.

Figure 13:
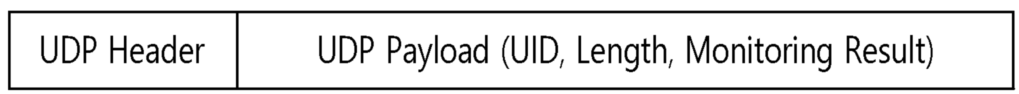
FIG. 13 is a security packet structure according to a second scenario.

FIG. 13 is a security packet structure according to a second scenario.

Referring to FIG. 13, the security check packet is a UDP packet format and contains a UDP header and UDP payload. The UDP payload may contain a user ID (UID) field, a length field, and a monitoring result field. For example, the UID field, the length field, and the monitoring result field may be defined as shown in Table 2 below.

TABLE 2

| Field | Byte length | Description |
|---|---|---|
| UID | 4 | This field indicates a user ID of UE |
| Length | 2 | This field indicates the byte length of the monitoring result field |
| Monitoring Result | Variable | This field indicates alive information, CPU usage and memory usage of UE |

Referring to Table 2, the UID field, comprising 4 bytes, indicates user ID or identification information of the terminal; the length field, comprising 2 bytes, indicates a byte length of the monitoring result field following the length field; and the monitoring result field indicates the security monitoring result of the terminal, such as alive information, CPU usage, memory usage, etc. Referring again to FIG. 12, since the NMSF cannot directly receive a security check packet, the NMSF may perform RTT measurement for segments (including the wireless segment and network segment) through which the security check packet has passed.

Specifically, the NMCF attempts a TCP connection using a 3-way handshaking procedure for transmitting a security check packet and transmits the security check packet to the server. The NMSF performs RTT measurement using a 3-way handshaking procedure performed to transmit a security check packet between the NMCF and the server. In an environment where information regarding the period or time at which the security check packet is transmitted is pre-agreed upon between the NMSF and the NMCF, the NMSF may perform RTT measurement at each specified period or time. In other words, the NMSF is aware in advance of at least the interval or time at which the NMCF will transmit the security check packet, and perform RTT measurement based on the 3-way handshake procedure for transmitting a security check packet. At this time, the NMSF may perform RTT measurement by mirroring signals exchanged in the 3-way handshaking procedure.

The NMCF and NMSF according to the present specification may be configured to selectively perform either the embodiment based on the first scenario, the embodiment based on the second scenario, or both embodiments. The NMCF and NMSF may support a first mode operating as an embodiment according to the first scenario and a second mode operating as an embodiment according to the second scenario. Alternatively, the NMCF and NMSF may adaptively switch modes based on network conditions. For example, the NMSF may be configured to operate in the second mode before being assigned an IP, and to operate in the second mode after being assigned an IP.

5G NPN and Network Security Monitoring

Figure 14:
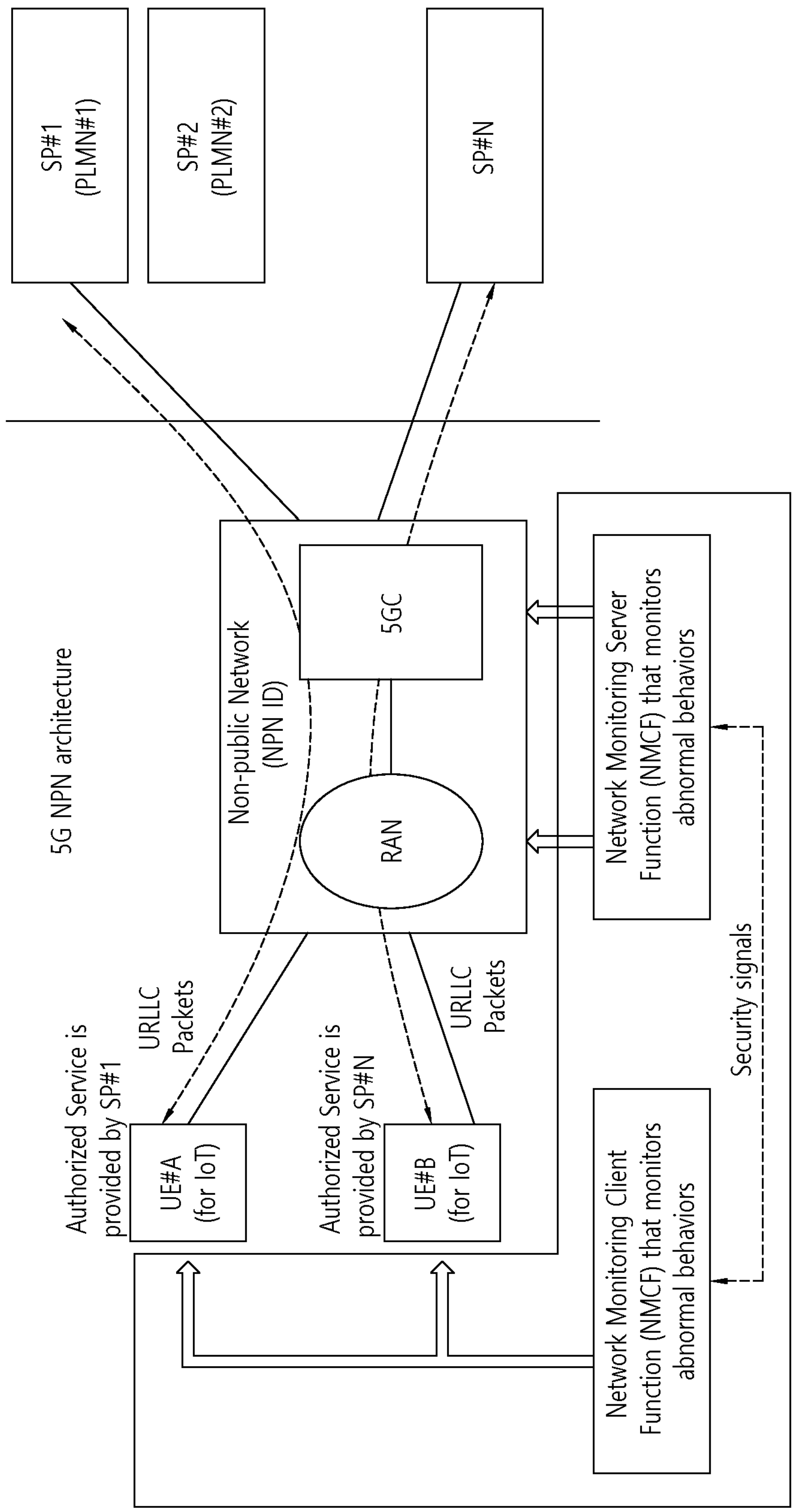
FIG. 14 is a view showing yet another example of a wireless communication system to which the technical features of the present disclosure may be applied.

FIG. 14 is a view showing yet another example of a wireless communication system to which technical features of the present disclosure may be applied. Specifically, FIG. 14 shows a system architecture system architecture based on a 5G NPN (non-public network) system. According to 3GPP TS 22.261, NPNs are referred to as private networks, and may be deployed in a variety of configurations, utilizing both virtual and physical elements. Here, NPNs may be deployed as completely standalone networks, may be hosted by a PLMN, or may be offered as a slice of a PLMN. Besides, NPNs may also be called by other terms, such as an enterprise business network, an enterprise-dedicated network, an enterprise private network, a government affairs network, a government-dedicated network, a government private network, a smart factory-dedicated network, and a smart city-dedicated network.

5G NPN is desirable for isolation from public 5G networks in order to ensure high-quality service requirements, high security requirements using dedicated security credentials, and security/privacy/performance/safety and to prevent malfunctioning.

5G technology is used to construct a 5G vertical service based on real-time IoT devices in smart factories and smart cities, by using URLCC which are requirements of 5G. In implementing such 5G vertical services by 5G NPNs, the 5G NPNs need to satisfy requirements of 5G from the perspective of security and performance when processing time-sensitive data of the IoT devices.

Referring to FIG. 14, a 5G NPN may include RAN and 5GC. The 5G NPN may be assigned an ID (NPN ID) for identification from other NPNs. A number of service providers (SP) SP #1, SP #2, . . . , SP #N may provide a URLLC packet service to each terminal UE #A and UE #B camping on or connected to the 5G NPN. A 5G NPN security architecture provides a vertical service that satisfies URLLC requirements by effectively eliminating threats from the inside or outside of the network and minimizing corresponding risks.

Hereinafter, a method for configuring a 5G NPN architecture including an NMSF and an NMCF is disclosed based on FIG. 14.

Figure 15:
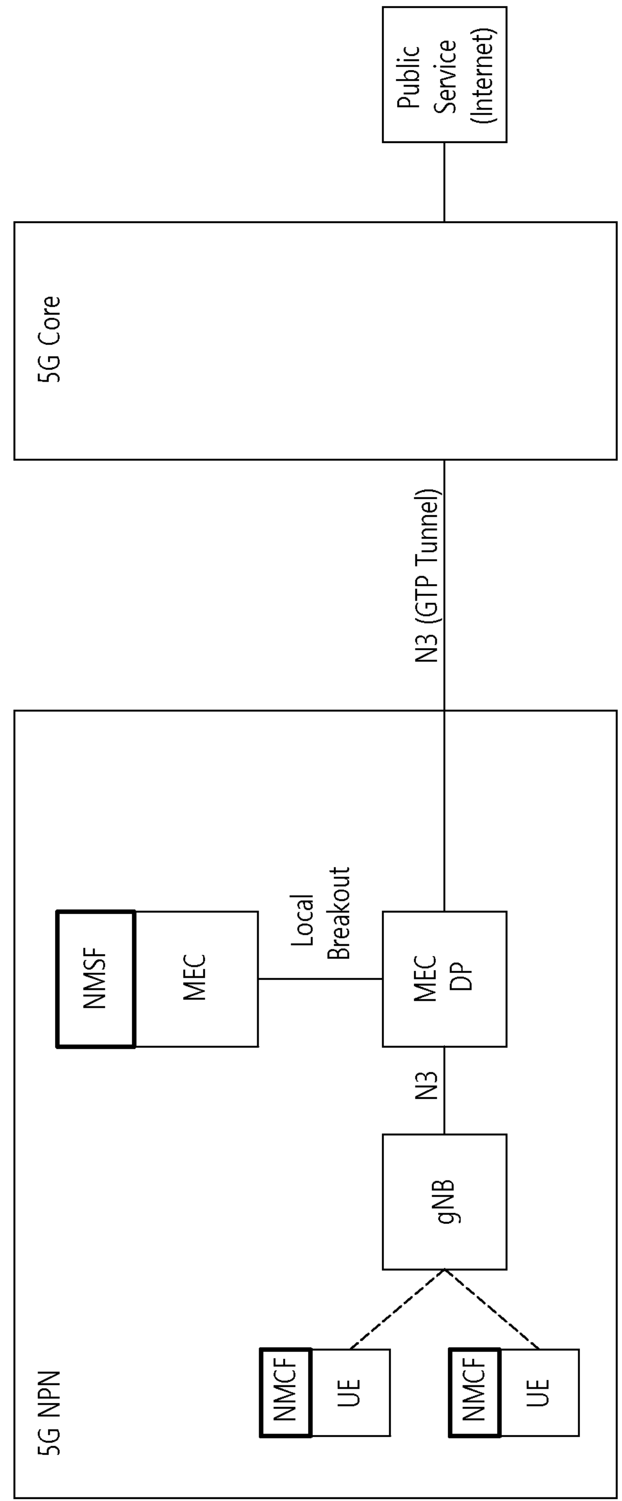
FIG. 15 shows a 5G NPN security architecture providing a network security monitoring function according to an example.

FIG. 15 shows a 5G NPN security architecture providing a network security monitoring function according to an example.

Referring to FIG. 15, an NMCF may be configured as being integrated with a terminal (or client node) constituting a 5G NPN as a module. For example, the NMCF may be stored as software in a chip or memory of a terminal, and may perform an operation of monitoring the security or performance of the terminal (or client node).

An NMSF may be configured as being integrated with a particular network node within a computing set constituting a 5G NPN. For example, the NMSF may be configured as being integrated with an MEC (multiple-access edge computing) which is a computing set or with at least one node (e.g., server node) within the MEC. In this case, the NMSF may be stored as software in a chip or memory within the at least one node, and may perform an operation of monitoring the security or performance of the 5G NPN through packets on an N6 interface that are coming in and out of the at least one node. Here, the MEC is a technology that mitigates core network congestion by deploying various services and caching content close to a terminal by employing a distributed cloud computing technology, and creates a new local service.

The NMCF may be integrated with the terminal, particularly, an IoT device, and is capable of communication with a gNB. Mounting the NMCF on an IoT device is one of effective means for ensuring security and URLLC performance in the 5G NPN. The NMCF may be implemented as software, and may be called an endpoint detection and response (EDR) entity or a micron engine (ME). The NMCF server may be located within the 5G NPN or at an edge cloud or within a common network domain. Terminals are connected to the gBN wirelessly. Each terminal transmits packets to the gNB or receives packets from the gNB. The gNB may be connected to a 5G core network or be connected to a local network via an N3 interface (or GTP tunnel). In this case, the packets flow through the N3 interface.

Figure 16:
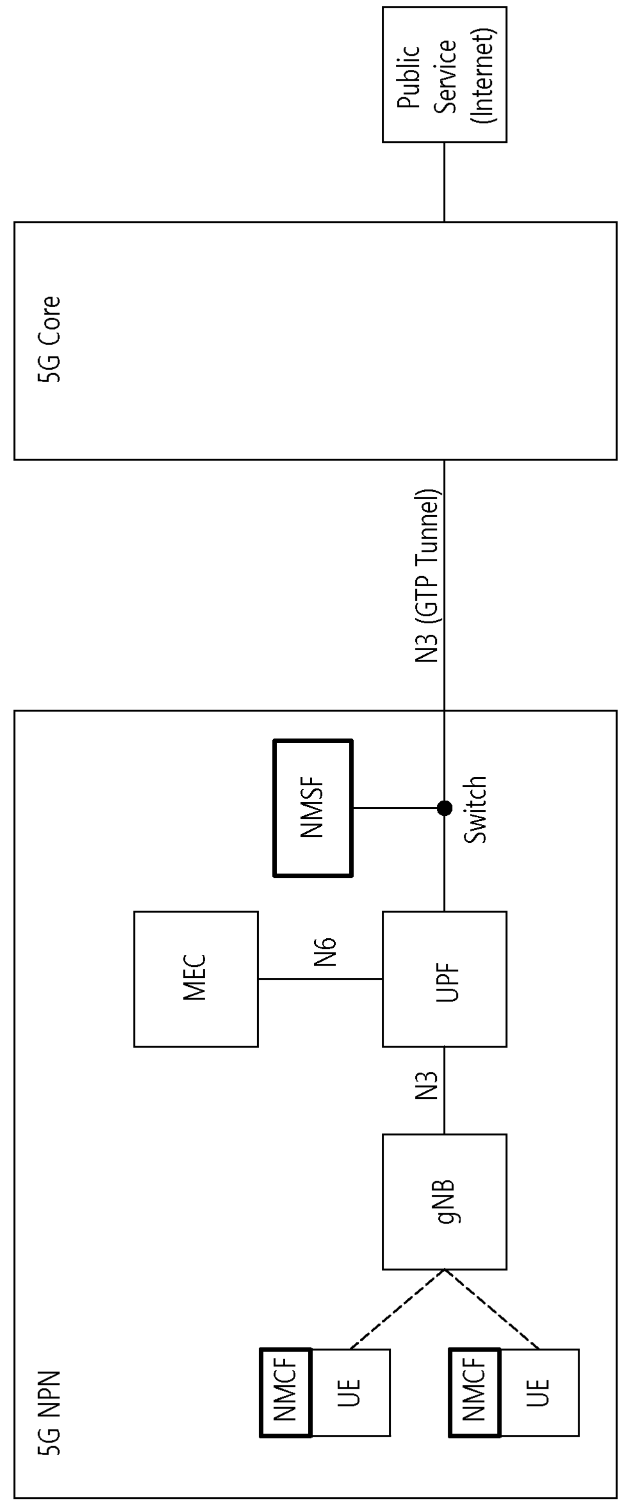
FIG. 16 shows a 5G NPN security architecture providing a network security monitoring function according to another example.

FIG. 16 shows a 5G NPN security architecture providing a network security monitoring function according to another example.

Referring to FIG. 16, an NMCF may be configured as being integrated with a terminal (or client node) constituting a 5G NPN as a module. For example, the NMCF may be stored as software in a chip or memory of the terminal, and may perform an operation of monitoring the security or performance of the terminal (or client node).

An NMSF is a standalone network node constituting the 5G NPN, which may be separated from other network nodes or entities. For example, the NMSF may be configured as a standalone network node separated from a UPF or an MEC.

In one aspect, the NMSF may be coupled to an input end or output end (e.g., N3 interface) of the UPF or coupled to an input end or output end of the MEC to monitor the security or performance of the 5G NPN through packets on the N3 interface. In a case where an NMSF is coupled to the output end of the UPF, the 5G NPN security architecture may further include a switch device for breaking out the N3 interface in order to mirror the packets on the N3 interface.

The NMCF and the NMSF may perform communication through the N3 N4 interface, for example, in order to share a security-related signal such as a monitoring result in the NMCF, and the sharing of the security-related signal may be based on an IP designated for the NMSF. If the 5G NPN uses a node-to-node encryption function such as IPSec, the NMSF may be configured at a point where decoded packets from the node are outputted.

Figure 17:
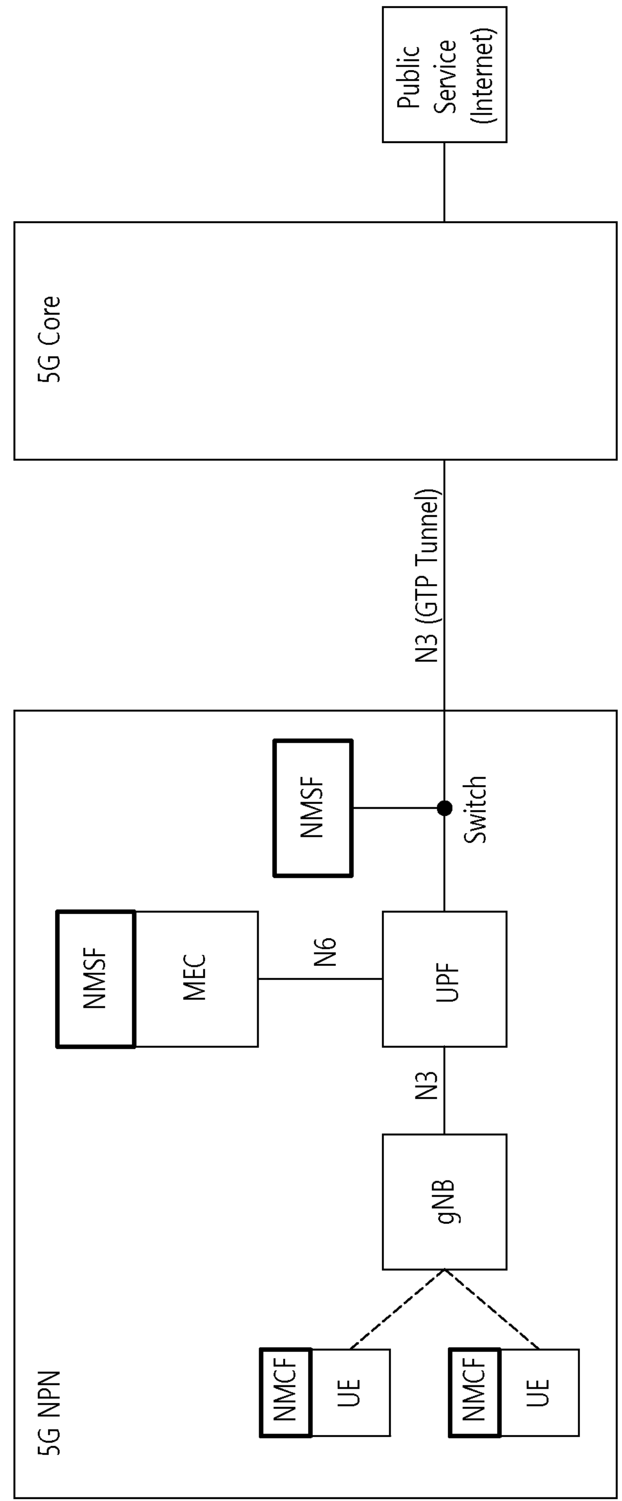
FIG. 17 shows a 5G NPN security architecture providing a network security monitoring function according to yet another example.

FIG. 17 shows a 5G NPN security architecture providing a network security monitoring function according to yet another example. FIG. 17 is different from FIGS. 15 and 16 in that a plurality of NMSFs are configured within a single 5G NPN.

Referring to FIG. 17, an NMCF may be configured as being integrated with a terminal (or client node) constituting a 5G NPN as a module. For example, the NMCF may be stored as software in a chip or memory of the terminal, and may perform an operation of monitoring the security or performance of the terminal (or client node).

A plurality of NMSFs may be configured within the 5G NPN. A first NMSF may be configured as being integrated with a particular network node within a computing set constituting the 5G NPN. For example, the first NMSF may be configured as being integrated with an MEC (multiple-access edge computing), which is a computing set, or with at least one node (e.g., server node) within the MEC. In this case, the first NMSF may be stored as software in a chip or memory within the at least one node, and may perform an operation of monitoring the security or performance of the 5G NPN through packets on an N6 interface that are coming in and out of the at least one node.

Also, a second NMSF is a standalone network node constituting the 5G NPN, which may be separated from other network nodes or entities. For example, the second NMSF may be configured as a standalone network node separated from a UPF or an MEC. In one aspect, the second NMSF may be coupled to an input end or output end of the UPF to monitor the security or performance of the 5G NPN through packets on the N3 interface. In a case where an NMSF is coupled to the output end of the UPF, the 5G NPN security architecture may further include a switch device for breaking out the N3 interface in order to mirror the packets on the N3 interface.

The NMCF and the first NMSF and/or second NMSF may perform communication through the N3 interface, for example, in order to share a security-related signal such as a monitoring result in the NMCF, and the sharing of the security-related signal may be based on an IP designated for the first and/or second NMSF. If the 5G NPN uses a node-to-node encryption function such as IPSec, the first and/or second NMSF may be configured at a point where decoded packets from the node are outputted.

The FIGS. 15 to 17 described above are embodiments of a 5G NPN security architecture in which one or two or more NMSFs and one or two or more NMCFs are disposed in various forms within a 5G NPN. However, the 5G NPN security architectures of FIGS. 15 to 17 are not exclusive of each other, and may be implemented as an embodiment which is a combination of one or two of them depending on their network characteristics and costs. Moreover, an embodiment in which an NMSF and an NMCF are deployed within a 5G NPN may be derived in various ways other than those in FIGS. 15 to 17, and it is needless to say that NMSFs may be integrated with other network entities or network nodes which are regardless of the UPF and/or the MEC.

According to a 5G NPN security architecture according to the present specification, effective security and performance monitoring in the 5G NPN may be achieved based on the NMSF and the NMCF.

Hereinafter, functions of an NMSF and an NMCF constituting a 5G NPN security architecture will be described in more detail.

First, the NMSF is configured to perform at least one of the following functions.

For example, the NMSF performs a function of obtaining at least one mirroring packet by mirroring a packet sent or received between a client node and a server node. Here, the client node may be a UE or an IoT device, for example. Packet mirroring is a technique of collecting and analyzing packets exchanged at a particular node. The NMSF also may further include a switching function or switch device for branching a connecting line between nodes for packet mirroring.

As another example, the NMSF performs a function of determining abnormal operations or security problems that threaten the security and performance of the 5G NPN based on information contained in the mirroring packet.

As yet another example, the NMSF performs an alerting function for an abnormal operation that disturbs URLLC requirements, based on security and performance monitoring results. Upon detecting an abnormal operation that threatens security or performance, the NMSF allows the user to properly deal with the abnormal operation by informing the user of the detected abnormal operation. The NMSF also sends alerting information to a security controller. The alerting information is information that instructs the security controller to take action against the abnormal operation. Upon receiving the alerting information, the security controller performs an operation (e.g., network shutdown) of recovering from the abnormal operation. The alerting information may be sent via an N3 interface (GTP tunnel) provided by a 3GPP signaling protocol.

Next, the NMCF is configured to perform at least one of the following functions.

For example, the NMCF performs a function of collecting packets or internal information sent and received by a client node on the network.

As another example, NMCF performs operations to monitor and determine network security threats associated with a client node based on the collected packets or internal information.

As yet another example, the NMCF performs an operation of notifying the NMSF of network security threat monitoring results by using an IP designated for the NMSF.

As a further example, the NMCF may display an alert to a user of an IoT device about an abnormal terminal operation.

As a further example, in performing the listed functions, the NMCF operates using computing resources of individual client nodes or IoT devices, and uses an amount of resources that will not affect the basic performance and functions of the individual client nodes or IoT devices.

Since the NMCF is able to sense an abnormal operation through data generated from a client node or an IoT device, it is capable of detecting the security status of the client node or the IoT device more accurately than the NMSF. Further, if the number of IoT terminals connected to the 5G NPN increases exponentially, monitoring all data flows can be a big burden to the NMSF, and therefore it is more effective to monitor the security and performance of the 5G NPN in cooperation with the NMCF. The NMCF integrated with the client node or the IoT device may stop operating due to a problem (e.g., power shutdown) with the client node or IoT device itself, and thus, the monitoring of security and performance by the NMSF is essential.

Calculation of Network Performance Indicators According to Packet Mirroring and Packet Analysis by Network Monitoring Device The following embodiment relates to a method of calculating network performance indicators according to packet mirroring and packet analysis by an NMSF. For convenience of explanation, the NMSF will be represented as a network monitoring device.

Figure 18:
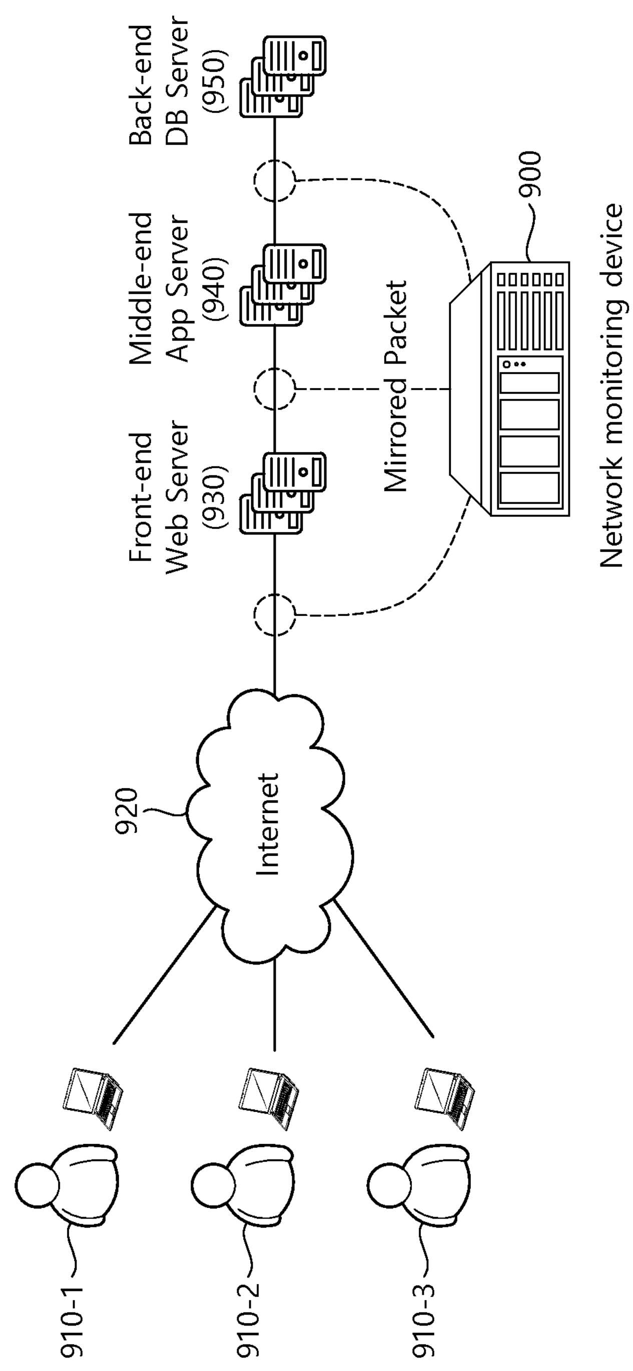
FIG. 18 is a conceptual diagram showing a system including a network monitoring device according to an embodiment of the present disclosure.

FIG. 18 is a conceptual diagram showing a system including a network monitoring device according to an embodiment of the present disclosure. As shown in FIG. 17, a network security and performance monitoring system according to an embodiment of the present disclosure may include user devices (same as the UEs in the previous drawings) 910-1 to 910-3, a network 920, server endpoints 930 to 950, and a network monitoring device 900. A network in this embodiment may include a 5G NPN, and the server endpoints 930 to 950 may include an MEC.

Referring to FIG. 18, the user devices 910-1 to 910-3 connect to a particular web site and/or a web application through the network 920. Here, the user devices 910-1 to 910-3 may be a handheld terminal, robot, or IoT device (e.g., sensor) on a 5G network. The connection is made at the server endpoints 930 to 950 associated with the web site and/or the web application.

According to the embodiment of FIG. 18, the user devices 910-1 to 910-3 access a particular web page through a web browser and make a request to run a desired page or application. The request may include running of multimedia content such as video and audio and/or other applications, as well as static content such as html documents.

According to an embodiment of the present disclosure, the user devices 910-1 to 910-3 may include a certain device that is operated by a user and includes a communication function (including internet access and web browser execution function and a data processing function. The user devices 910-1 to 910-3 may be referred to as a mobile station (MS), a user equipment (UE), a user terminal (UT), a wireless terminal, an access terminal (AT), a terminal, a stationary or mobile subscriber unit, a subscriber station (SS), a cellular phone, a wireless device, a wireless communication device, a wireless transmit/receive unit (WTRU), a mobile node, a mobile, a mobile station, a personal digital assistant (PDA), a smartphone, a laptop, a netbook, a personal computer, a wireless sensor, consumer electronic equipment, a robot, an IoT device, or other terms. Various embodiments of the user devices 910-1 to 910-3 may include, but are not limited to, cellular telephones, smartphones having wireless communication capabilities, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances enabling wireless Internet access and browsing, as well as portable units or terminals that incorporate combinations of such functions.

Each user device 910-1 to 910-3 may include a user communication interface including input devices such as a mouse and keyboard for receiving user input, and a display for providing a control user interface for a user to interact with networked devices. The user interface may include a graphical user interface (GUI) for providing information to the user.

The network 920 may include a wired and/or wireless network. The network 920 may include the Internet, and includes a 5G SA (standalone) system or a 5G NSA (non-standalone) and/or 4G system. The network 920 may include a serial bus that provides a physical layer (medium) to send and receive data between various connected user devices 910-1 to 910-3 and the server endpoints 930 to 950. Here, the serial bus may include a 1394 serial bus. The 1394 serial bus may support, but is not limited to, both time-multiplexed audio/video (A/V) streams and standard IP (Internet Protocol) communications (e.g., IETF RFC 2734). The network 920 may include a non-1394 network (e.g., Ethernet, etc.) as well. Also, the network 920 may include a home network. Each user device 910-1 to 910-3 may communicate with one or more server devices 930 to 950 in the network 920.

The server endpoints 930 to 950 respond to requests from users by using resources of the network 920, in order to provide services to the users. The server endpoints 930 to 950, though they are put that way, are not necessarily need to be a server related to a particular web site. They may be a single server device. In this specification, the term "server" may refer to another entity communicating with a particular user device 910-1 to 910-3, a target entity the user device 910-1 to 910-3 has requested to communicate with, a controller device (a central controller for controlling a robot or an IoT device) that controls the user device 910-1 to 910-3, and/or a base station (eNB, gNB, etc.).

The server endpoints 930 to 950 perform returning of information (data) in response to a request from the user device 910-1 to 910-3. Also, the returning may include returning of the performance (e.g., mechanical performance) and state of a function, returning of a data stream and its state, receiving a data stream and returning of its state, or saving of states for various actions. The server endpoints 930 to 950 may include a custom, embedded, and control program to implement control of their own hardware.

The server endpoints 930 to 950 may be associated with a particular web site and/or web application, and performs calculations and management related to tasks performed at each web site and/or web application. The server endpoints 930 to 950 may interact with the user devices 910-1 to 910-3 and other servers 930 to 950. Exemplary services may include MPEG sourcing/sinking and display services.

The server endpoints 930 to 950 may process information such as interface data (e.g. HTML, XML, Java, JavaScript, GIF, JPEG, MPEG, graphics files, or any other format useful for the intended purpose) that provides an interface for commanding and controlling of the device over the network. In certain embodiments, each server 930 to 950 may process information such as one or more Hypertext markup Language (HTML) pages that provide for the commanding and controlling of that device. Using the browser technology, the server endpoints 930 to 950 employ Internet standards to render HTML pages.

According to an embodiment of the present disclosure, the server endpoints 930 to 950 may include a web server 930, an APP server 940, and a database server (DB server) 950. However, the server endpoints are not necessarily composed of a combination of three servers. Only the web server 930 may be present, not the app server 940 and the database server 950, whereas the APP server 940 alone may be present or other server combinations of various forms and layers are possible.

The web server 930 is a server that provides requested content to a web client. The web server 930 may provide static images such as HTML, JPEG, or GIF to a web browser through an HTTP protocol. In some cases, the web server 930 also may have a container embedded in it, for running an internal application.

The APP server 940 may be called a WAS (web application server) server, which is a middleware software server that provides transaction processing and management and an application execution environment in a client/server environment. Typically, the server endpoints 930 to 950 may be constructed in a three-layer web computing environment of a web server, an application server, and a database, and in this case, the APP server 940 serves as an application server in the client/server environment. The APP server 940 provides an application execution environment a database access function, manages transactions, performs a business logic for handling tasks, and performs interfacing of an application between different types of systems.

According to an embodiment of the present disclosure, effective distribution may be induced through functional classifications of the web server 930 and the WAS 940. Static data may be processed by the web server 930 which exists at the front in structure, and dynamic data may be processed by the WAS 940 at the back. For example, for a user's request, static data such as HTML and Java Script files, CSS, and images is located at and processed by the web server 930 at the front, so that the service request is not passed to the WAS 940. Also, the WAS 940 may focus on running web applications by passing web application services to the WAS 940 which is located at the back. The method of processing some data by the web server 930 and passing some data to the WAS 940 may be performed through a configuration of the web server 930. Whether to pass a particular extension or directory task to the WAS 940 or not is handled by the web server 230.

The database server 940 is an area for storage of various types of data handled by the web server 930 and/or the APP server 940. The database server 950 may store tremendous amounts of data associated with tasks, websites, and web applications processed by the web server 930 and/or APP server 940, depending on the characteristics of those tasks, websites, and web applications. This data may include personal information, organization information, and data associated with various content (e.g., multimedia content).

The network monitoring device 900 may be disposed between at least one of the network 920 and the web server 930, the web server 930 and the APP server 940, and the APP server 940 and the database server 950. The network monitoring device 900 is connected to a switch device (not shown) disposed between at least one of the network 920 and the web server 930, the web server 930 and the APP server 940, and the APP server 940 and the database server 950 to diagnose the performance of a network service based on mirroring packets of packets sent and received between two entities. According to the embodiment of the present disclosure, the mirroring packets may be generated by duplication based on packets (actually used user traffic) actually sent and received, so there is no need to artificially generate test packets for the performance diagnosis of the network service. In particular, the network monitoring device 900 is capable of monitoring all packets in real time.

The network monitoring device 900 calculates various indicators in real time which represent the performance of the network service based on various information included in the mirroring packets (e.g., a source ID, a destination ID and time information, input port information, output port information, etc.). The calculation of indicators may be done in units of transactions. More than 120 indicators may be calculated, which will be described below in more detail with reference to FIG. 12. The network monitoring device 900 may determine by segment whether there is a problem such as speed latency, queuing delay, overflow traffic, and error occurrence in a certain segment and visualizes a determination result so that the administrator or manager can see it. That is, an error segment may be quickly detected, and, based on this, the error segment may be quickly dealt with.

Moreover, the network monitoring device 900 is able to tracking accesses (related to security issues) from malicious users by analyzing mirroring packets, and may deal with this in real time.

According to the embodiment of the present disclosure, the network monitoring device 900 is connected to the switch device, and therefore may not require the installation of an agent which puts a substantial load on the server endpoints 930 to 950. That is, it does not bear the burden of delaying the working speed of the server endpoints 930 to 950 or the like. However, the network monitoring device 900 is not necessarily configured in a hardware manner, but may be installed and operate on a switch device or other devices in a software manner.

Figure 19:
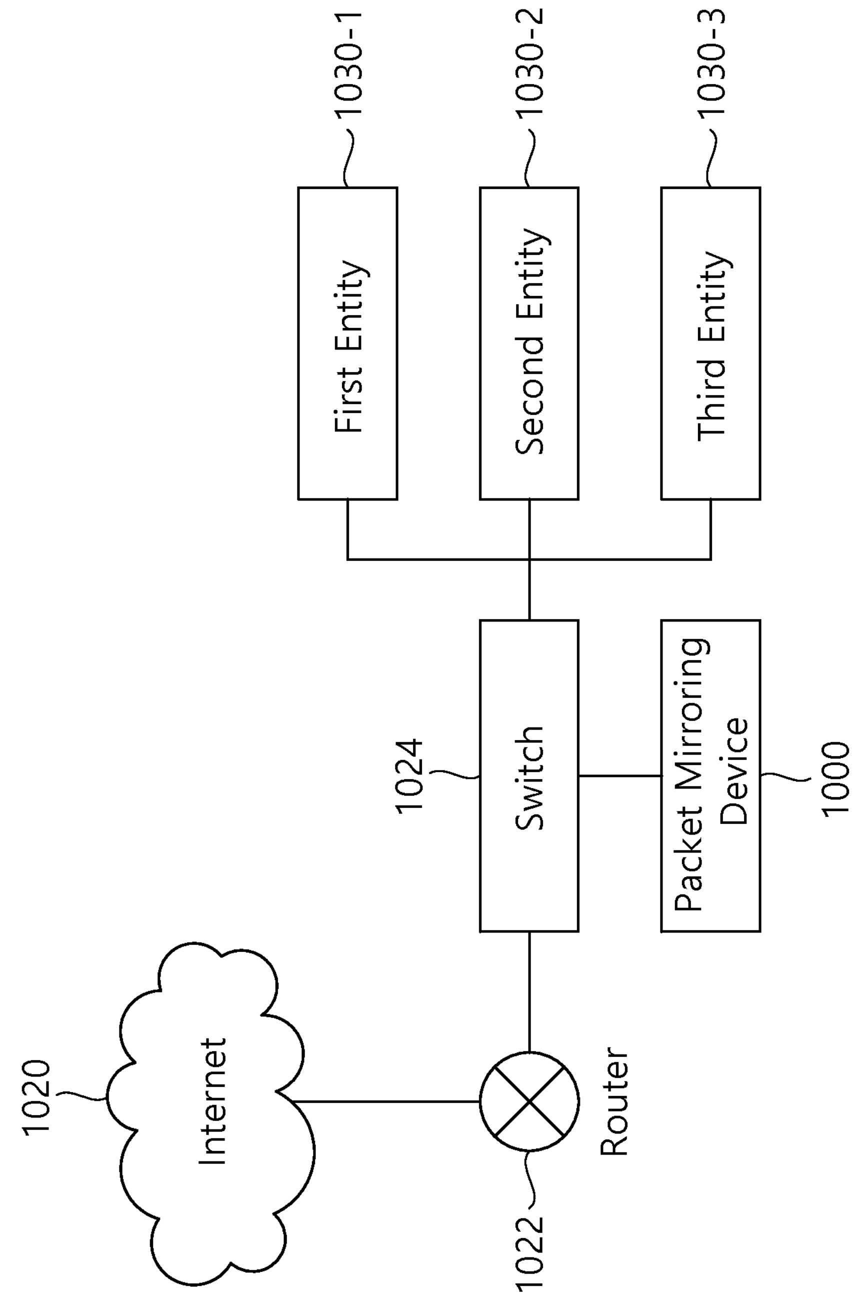
FIG. 19 is a block diagram showing a configuration for connecting a network monitoring device according to an embodiment of the present disclosure and another device in a network.

FIG. 19 is a block diagram showing a configuration for connecting a network monitoring device according to an embodiment of the present disclosure and another device in a network.

Referring to FIG. 19, a router 1022 is connected to a network such as the Internet 1020, and the router 1022 is connected to a switch 1024 and sends a request from a user terminal (not shown) to servers 1030-1 to 1030-3 related to the request and sends information related to a response to the request from first to third entities 1030-1 to 1030-3 to the user terminal. The first to third entities 1030-1 to 1030-3 may be different servers. Alternatively, the first to third entities 1030-1 to 1030-3 may be different user terminals as viewed from the client side, and the network monitoring device 1000 may analyze packet-related information by mirroring packets for communication between the user terminals because these packets also pass through the switch 1024.

The router 1022 or a router (not shown) having a routing function extracts the location and recipient of a packet transmitted from a user terminal and designates an optimum path for that location and directs the data packet to the switch 1024 along this path. The router 1022 identifies the IP address and forwards the data to the switch 1024.

If the first to third entities are servers, the switch 1024 stores unique MAC addresses of the servers 1030-1 to 1030-3, determines which packets should be transmitted via these addresses and where, and sends a packet provided from the router 1022 to a corresponding server 1030-1 to 1030-3. The switch 1024 includes a switch that serves as an OSI 2 layer, an OSI 3 layer, an OSI 4 layer, and/or another layers (e.g., OSI 7 layer). For example, it may perform a function of configuring a path. Also, it may perform functions like load balancing, port forwarding, QoS, and the like. The switch 1024 also may be referred to as a network switch, a switching hub, a port switching hub, or the like.

The network monitoring device 1000 is connected to the switch 1024 and mirrors and obtains almost every packet provided to the servers 10301 to 1030-3 through the switch 1024. Packet mirroring, that is, packet duplication or capture, may performed by the switch 1024. In some cases, this may be performed by the network monitoring device 1000 itself. The switch 1024 may duplicate a packet provided to the servers 1030-1 to 1030-3, and then a port connected to the network monitoring device 1000 may be configured as a destination port and provided to the network monitoring device 1000. In this instance, this port may be designated and provided for analysis purposes.

Figure 20:
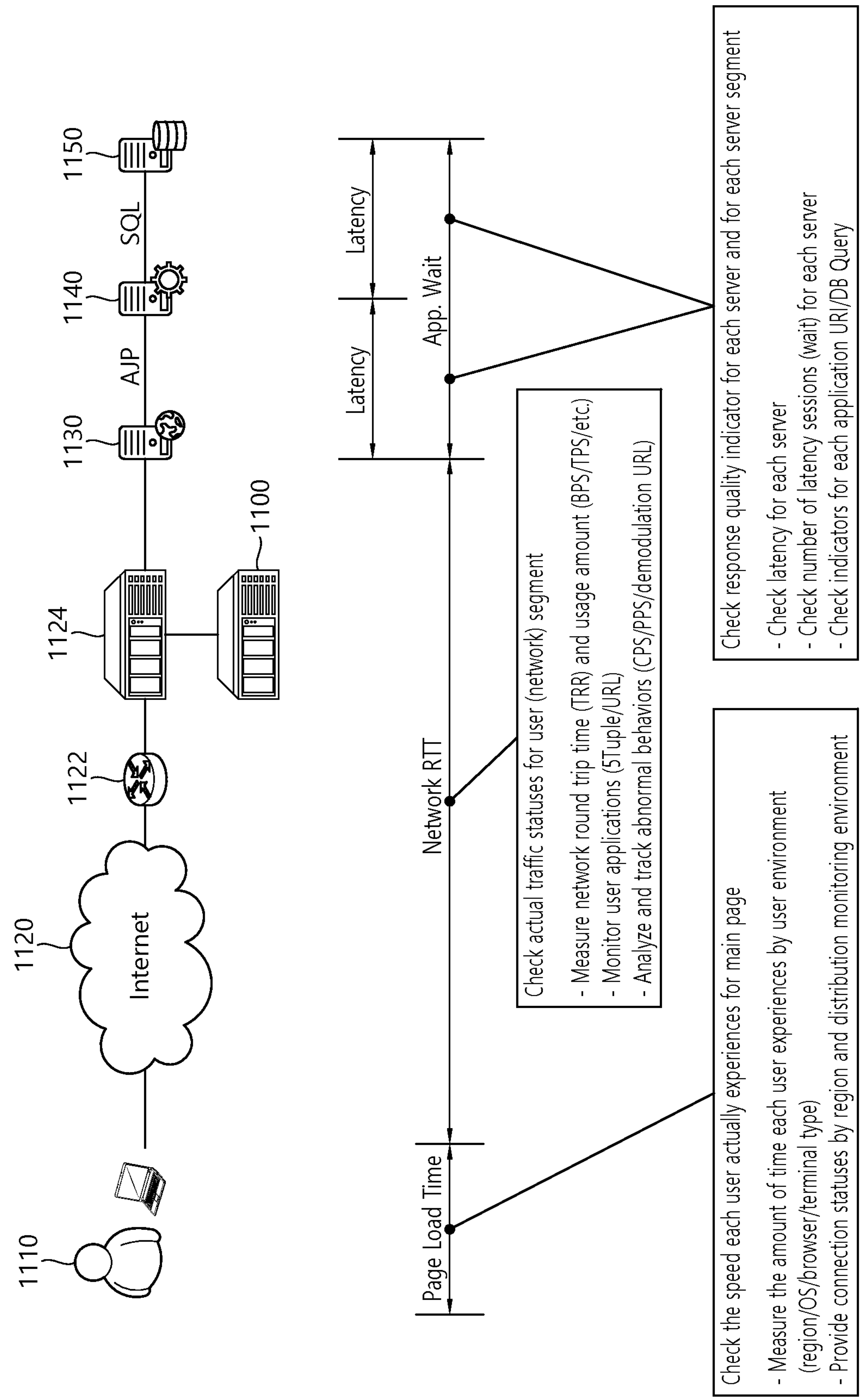
FIG. 20 is a conceptual diagram for explaining how a network monitoring device according to an embodiment of the present disclosure operates for each segment.

FIG. 20 is a conceptual diagram for explaining how a network monitoring device according to an embodiment of the present disclosure operates for each segment.

Referring to FIG. 20, as explained with reference to FIGS. 18 and 19, a user terminal 1110 sends packets to server endpoints 1130, 1140, and 1150 via the Internet 1120, in which case a router 1122 and a switch 1124 are present between the Internet 1120 and the server 1130, and a network monitoring device 1100 is connected to the switch 1124.

The network monitoring device 1100 may check the amount of delay time the user experiences on the user terminal 1110 by analyzing mirroring packets. Also, it is possible to obtain information related to traffic to the first server 1130 via the Internet 1120, and to check the latency at the server endpoints 1130, 1140, and 1150. In particular, the latency at the server endpoints 1130, 1140, and 1150 is determined for each segment. Latency may be calculated and handled separately for the segment between the web server 1130 and the WAS 1140 and the segment between the WAS 1140 and the DB server 1150. Web latency and App latency may be calculated separately. Here, the web latency refers to a period of delay until a static URL (image (gif, png, jpg, etc.), css, js, text, and so on) receives data from the web server 1130, and the App latency refers to a period of delay until a first packet of a generated page is received from a dynamic URL or a post URL. The App latency may be associated with dynamic content containing a query parameter, dynamic content (page) such as HTML, ASP, JSP, and PHP, and/or a call using an HTTP POST method. That is, it represents a delay time related to a task that is returned via the WAS server 1140 and/or the DB server 1150.

First, the speed the user experiences on the user terminal 1110 is assumed to be page load time. It is analyzed and visualized as the speed each user experiences for each main web page. That is, when there are multiple users accessing a particular web page, the amount of time these multiple users experience by user environment and/or by region. The user environment may vary depending on the OS installed on the user terminal, the type of web browser, and the type of terminal. Also, connection statuses by region and a distribution monitoring environment may be provided. In this instance, the regional access statuses may be divided into global regional statuses targeted for the entire world and local regional statuses targeted for regions within the country.

An actual traffic status for a user segment (network segment) until the server 1130 is reached may be represented by a network round trip time (RTT). It also may be referred to as the time taken across a network. In addition, in relation to usage amount, BPS (Bit Per Second) information indicating a data transfer rate per second, UPS (User Per Second) information indicating the number of users connected per second, CPS (Connection Per Second) information indicating the number of new sessions connected per second, and TPS (Transaction Per Second) information indicating the number of transactions made per second may be obtained as well. Moreover, user applications may be monitored, and abnormal behaviors by users may be analyzed and tracked. Through these performance-related indicators, applications occupying network traffic may be detected, and correlations between user, application, and network may be monitored.

Additionally, the network monitoring device 1100 may check a period of delay between each server 1130, 1140, and 1150. That is, response quality indicators for each server segment may be determined. Here, latency for each server, number of latency sessions (wait) for each server, and indicators for each application URI, and/or indicators for each query of a DB server (DB query) may be determined.

Figure 21:
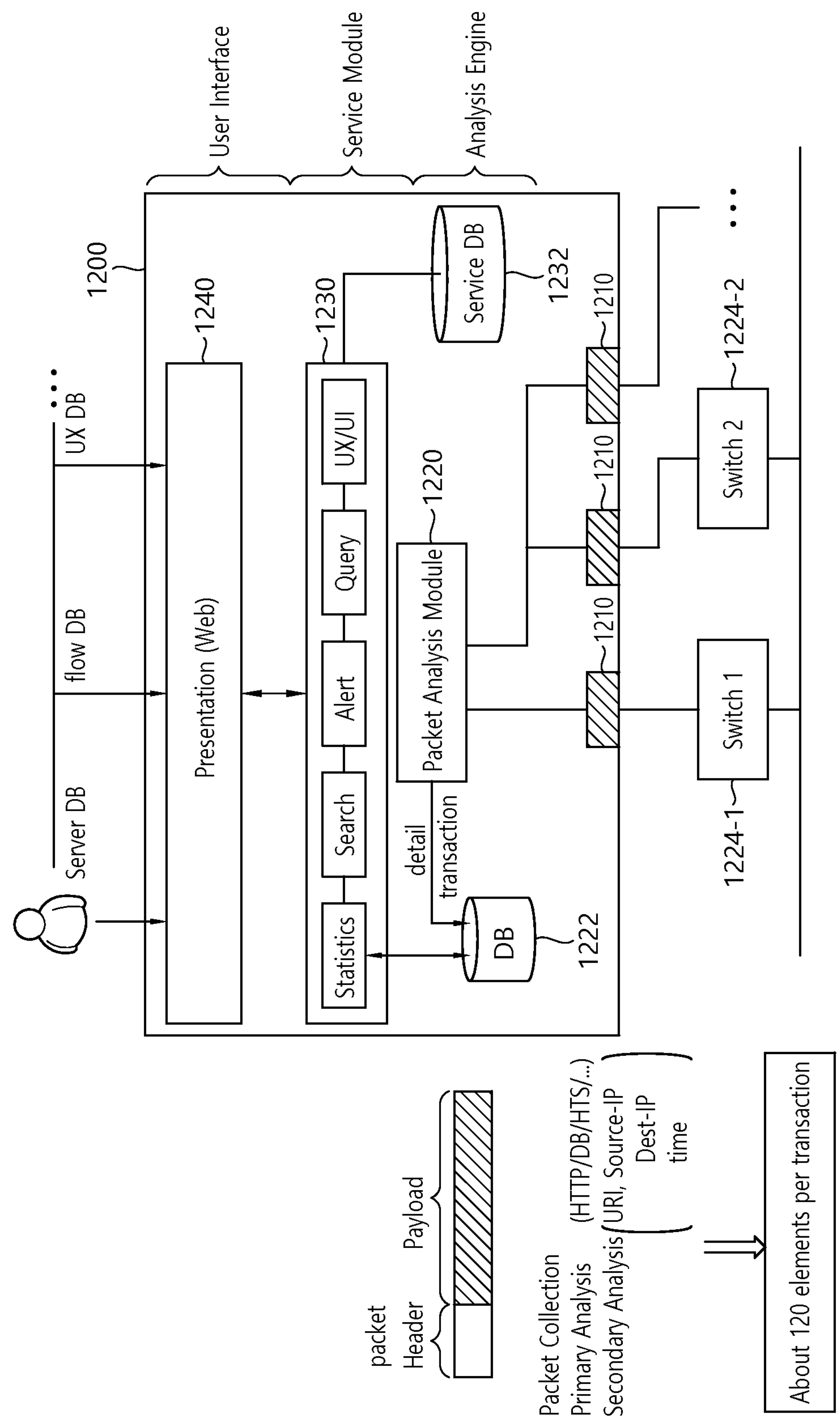
FIG. 21 is a block diagram showing specific details of a network monitoring device according to an embodiment of the present disclosure.

FIG. 21 is a block diagram showing specific details of a network monitoring device according to an embodiment of the present disclosure. As shown in FIG. 21, a network monitoring device 1200 according to an embodiment of the present disclosure may include a port 1210, a packet analysis module 1220, a service module 1230, and a user interface 1240. Also, it may further include a packet analysis database 1222 and a service database 1232.

Referring to FIG. 21, at least one port 1210 may be provided, and is connected to switch devices 1224-1, 1224-2, . . . . A single port may be connected to a single switch device. The connected ports may receive information on mirroring packets from the switch devices 1224-1, 1224-2, . . . and send the mirroring packets to the packet analysis module 1220.

The packet analysis module 1220 collects a mirroring packet, and substantially analyzes the packet. It may be referred to as an engine. The packet analysis module 1220 primarily analyzes the header of the packet from the mirroring packet. By this, it is possible to identify whether the packet is an HTTP packet, a packet related to a DB, or a packet related to a TCP. That is, it is identified which protocol the packet is related to. By this, it is possible to find out to which server request information such as "GET/web address/HTTP/1.1" is transmitted to. The packet analysis module 1220 construes by parsing such packet header information. "GET" is a request message, and "web address" is a web address related to the request. Also, "HTTP/1.1" refers to an HTTP 1.1 version, and besides linguistic information (e.g., ko-kr) related to the packet may be obtained and stored. In a request method, POST, HEAD, PUT, DELETE, etc., in addition to GETM, may be sent depending the situation, and the packet analysis module 1220 stores such information along with time information and a related IP.

The packet analysis module 1220 assigns an index to each packet, and identifies whether the packet is a corresponding pocket, that is, an HTTP-based request packet, or a response packet for it. In this case, a comparative analysis of information obtained from previously received packets is conducted. That is, when there is a request packet obtained from a first entity, there may be a response packet from a second entity afterwards, and in this instance, one session establishment and transaction flows may be analyzed based on at least two time-series packets and packets transmitted to and received from the first and second entities.

Moreover, the packet analysis module 1220 may find out which browser the user terminal has used, and parse HOST-related information, previous URL address information, and browser support language information. In this instance, the header may be analyzed to find out which type of header it is (a general header, a request header, or an entity header), and information indicating a boundary between the header and the payload may be parsed.

Next, the packet analysis module 1220 secondarily analyzes URL (Uniform Resource Locator) (or URI (uniform resource identifier)) of a mirroring packet, a source IP (Source_ip) destination ID (Dest_ip), and time information. Here, the URL may indicate which address the packet is redirected to, as in "https//www.google.co.kr/?gws_rd=ssl". Also, the source IP may indicate the IP address of the user terminal, and the destination IP may indicate the IP of a server related to a final destination site. In the case of a response packet, this information may be put the other way around. The time information may be provided in the form of a time stamp. Besides, length information of the entire packet may be obtained.

The packet analysis module 1220 includes packet analysis algorithms corresponding to different protocols, that is, various protocols such as HTTP, IP, UDP, TCP, and DNS, for example, and may adaptively extract an URL, a source IP, a destination IP, and time information from a packet according to each protocol and use them on analysis.

Based on such packet-related information extracted by the secondary analysis, performance indicator information of about 120 elements per transaction may be generated. Preferably, 6,000 transactions are analyzed in a second. Then, the extracted packet-related information and the information of about 120 performance indicators generated per transaction are stored in the database 1222. Hereinafter, performance-related indicators generated based on packet-related information of mirroring packets will be described in more detail.

The packet analysis module 1220 calculates round trip time information (RTT information) in units of transactions. That is, it calculates round trip time information of a signal.

Also, the packet analysis module 1220 generates session information. It may refer to the number of sockets established per second, that is, the number of sockets connected without being connected. Also, the packet analysis module 1220 calculates latency information which is the time it takes for the user terminal to send a request and receive a response from a particular server. This may be viewed as the delay time it takes to query a database or run an application or perform other tasks. On the contrary, from the point of view of a server toward a user terminal, the time it takes for the server to send a request and receive a response from a particular user terminal may be calculated as latency.

The packet analysis module 1220 calculates BSS information indicating the length of bits transmitted or received per second, PPS (Packet Per Second) information indicating the number of packets transmitted or received per second, and UPS information indicating the number of users connected per second (for an IP). That is, the number of users connected in a second may be calculated based on the number of source IPs connected to a particular destination IP. Besides, CPS information (indicating how many new sessions are connected in a second) indicating the number of new sessions connected per second and TPS information (indicating how many transactions are made in a second) indicating the number of transactions made per second are calculated. Also, the packet analysis module 1220 calculates HPS (Hit Per Second) information indicating the number of URLs requested per second. In this case, in the case of a server HPS, the packet analysis module 1220 calculates HPS based on the number of URLs requested per second by a server, and in the case of a client HPS, calculates HPS based on the number of URLs requested per second by a client. Also, the packet analysis module 1220 calculates SPS (Server Per Second) information which is the number of servers connected per second. This indicates how many servers the client is connected to in a second.

The service module 1230 provides statistics based on performance-related indicators stored in the database 1222. The statistics may be provided for a particular server, a particular user, each URL, each session, a server group located in a particular region, a client group located in a particular region, and/or each web page. The service module 1230 properly visualizes the performance-related indicators so that the user is able to intuitively know the performance of a service for a current network, by using preset visualization tools of various forms The visualization is performed based on statistics. That is, a meaningful graph or table may be generated by putting together indicators related to a particular medium. For example, tasks, such as creating a list of sessions at specific hours in relation to a particular client or server or creating a table for a database query generated at that time, may be performed. That is, the performance-related indicators related to a network service are stored along with time information (timestamp information) of the corresponding packet, and therefore, a flow map may be created so that a packet flow at specific hours is understood in a relationship with a client terminal and a server endpoint. A variety of statistics and a visualization method for them will be described in more detail with reference to the drawings below.

The service module 1230 may perform search and query based on criterion variables such as a desired time or desired environment (e.g., the type of a particular web browser or the type of a particular user terminal (whether it is mobile or PC)), in order to create a specific graph or a specific table/list in response to an input from the user. The service module 1230 may create visualization information of a proper form by classifying desired data based on a selected criterion variable.

According to an embodiment, the service module 1230 may perform an alert function which finds out and shows if there is anything wrong in a network service. For example, if the number of waits is above a threshold, it is determined that there is a problem with the response speed in the corresponding segment, and the problem in that segment may be visually displayed. As a means of alerting to a problem, a visually different representation may be necessarily provided, or a text message may be sent to the user terminal or a warning signal may be sent to it. This will be described in more detail with reference to FIG. 19.

Various statistic data generated by the service module 1230, visualization information data, information related to a visualization tool, information on various thresholds set by the user, and information on various thresholds set by the user may be stored in the service database 1232, and when the user requests certain processed information via the user interface 1240, the corresponding information may be returned.

The user interface 1240 includes a device that receives various inputs from the administrator and outputs visualized information such as a graph or table generated by the service module 1230. It may include an input means such as a mouse, a keyboard, and a touchpad, and an output means such as a monitor and a touchscreen. The user may enter information on a server (e.g., a server name, a server IP, a related URL, a port, a sort number, server location information, an IP area that can be processed, and so on), a flow database related to connections (links) to various server endpoints, and UX/UI database information including a visualization tool for outputting to the user and/or metadata related to visualization. Also, a rule set for determining the occurrence of a problem and various setting values related to the rule set may be entered.

Enterprise or Government Affairs Network and NMCF, NMSE

In the following embodiments, a Data Traffic Analysis Function (DTAF) refers to an NMSF when the NMSF is applied to a network configuration specialized for an enterprise or government affairs network, which may perform the same function as the above-described NMSF though they are different terms. Also, a user terminal may include an NMCF. In addition, an enterprise business network or a government affairs network may be implemented as the above-described 5G NPN.

The above-described system or apparatus may be implemented as a hardware component, a software component and/or a combination of them. For example, the system, apparatus, and components described in the embodiments may be implemented using one or more general-purpose computers or special-purpose computers, for example, a processor, a controller, an arithmetic logic unit (ALU), a digital signal processor, a microcomputer, a field programmable array (FPA), a programmable logic unit (PLU), a microprocessor or any other device capable of executing or responding to an instruction. The processing apparatus may perform an operating system (OS) and one or more software applications executed on the OS. Furthermore, the processing apparatus may access, store, manipulate, process, and generate data in response to the execution of software. For convenience of understanding, one processing apparatus has been illustrated as being used, but a person having ordinary skill in the art may understand that the processing apparatus may include a plurality of processing elements and/or a plurality of types of processing elements. For example, the processing apparatus may include a plurality of processors or a single processor and a single controller. Furthermore, other processing configurations, such as a parallel processor, are also possible.

Software may include a computer program, code, an instruction, or a combination of one or more of them and may configure the processor so that it operates as desired or may instruct the processor independently or collectively. The software and/or data may be embodied in a machine, component, physical device, virtual equipment, computer storage medium or device of any type or a transmitted signal wave permanently or temporarily in order to be interpreted by the processor or to provide an instruction or data to the processor. The software may be distributed to computer systems connected over a network and may be stored or executed in a distributed manner. The software and data may be stored in one or more computer-readable recording media.

The method according to the embodiments may be implemented in the form of a program instruction executable by various computer means and stored in a computer-readable recording medium. The computer-readable recording medium may include a program instruction, a data file, and a data structure solely or in combination. The program instruction recorded on the recording medium may have been specially designed and configured for the embodiment or may have been known to those skilled in the computer software. The computer-readable recording medium includes a hardware device specially configured to store and execute the program instruction, for example, magnetic media such as a hard disk, a floppy disk and a magnetic tape, optical media such as CD-ROM and a DVD, magneto-optical media such as a floptical disk, ROM, RAM, and flash memory. Examples of the program instruction may include high-level language code executable by a computer using an interpreter in addition to machine-language code, such as those generated by a compiler. The hardware devices may be configured to operate as one or more software modules in order to perform the operation of the present disclosure, and vice versa.

While the embodiments have been described above with a few embodiments and the accompanying drawings, one of ordinary skill in the art may make various modifications and changes to the description above. For example, appropriate results can be achieved even if the above-described techniques are performed in a different order from that in the above-described method, and/or the above-described elements such as systems, structures, devices, and circuits are coupled or combined in different forms from those in the above-described method or are replaced or substituted with other elements or their equivalents.

Therefore, other implementations, other embodiments, and equivalents to the claims are also within the scope of the following claims.

What is claimed is:

1. A network security monitoring method performed by a network monitoring device, the method comprising:

monitoring a status of a client terminal;

obtaining a security check packet, generated based on a result of the monitoring, from a network, the security check packet containing user ID (UID) information of the client terminal, length information, and monitoring result information;

obtaining a mirroring packet, mirrored in a network switch device, from the network; and performing security monitoring on the network based on at least one of the security check packet and the mirroring packet.

2. The network monitoring method of claim 1, wherein:

the security monitoring of the network is performed by the network monitoring device that is assigned an IP address on the network, and the obtaining of the security check packet from the network comprises receiving the security check packet by the network monitoring device using the IP address.

3. The network monitoring method of claim 2, wherein the security check packet is a TCP packet format that contains at least a TCP header and a TCP payload, and the TCP payload contains field information of at least one of a UID field, a length field, and a monitoring result field.

4. The network monitoring method of claim 1, wherein:

the security monitoring of the network is performed by the network monitoring device that is not assigned an IP address on the network, and the obtaining of the security check packet from the network comprises obtaining the security check packet by the network monitoring device through monitoring a path on the network.

5. The network monitoring device of claim 4, wherein the security check packet is a UDP packet format that contains at least a UDP header and a UDP payload, and the UDP payload contains field information of at least one of a UID field, a length field, and a monitoring result field.

6. The network monitoring method of claim 1, wherein:

the UID information is information used to uniquely identify at least one of the client terminal or a client monitoring device that monitor a status of the client terminal, wherein the length information is information indicating a length of the monitoring result information, and the monitoring result information is information indicating a result of monitoring a status of the client terminal.

7. The network monitoring method of claim 1, wherein the security monitoring of the network is performed by a network monitoring device that is located and operating in at least one of the following: a standalone network node connected to the network, an input or output end of a plane on the network, or a server which is a destination for a packet on the network.

8. The network monitoring method of claim 1, wherein the security packet is generated when it is determined that a security problem has occurred on the client terminal based on at least one of the following: monitoring system log files of the terminal; determining an attempt to access the terminal from an IP not included in a whitelist of permitted IPs; analyzing packet information regarding the terminal; analyzing status information of the terminal; and obtaining alive information indicating a connectivity status of the terminal.

9. The network monitoring method of claim 1, wherein:

the performing of the security monitoring on the network comprises utilizing a packet analysis algorithm corresponding to at least one protocol of HTTP, IP, UDP, TCP, and DNS, and the packet analysis algorithm is configured to analyze the mirroring packet by adaptively extracting at least one of a URL, a source IP, a destination IP, and time information from the mirroring packet according to the at least one protocol, and configured to determine at least one of the following based on the mirroring packet: a user experience delay time on a user terminal, traffic up to a first server through the Internet, a latency in each server segment, a web latency, an app latency, a latency between servers, a latency for each server, a number of latency sessions (waits) for each server, an index for each application URI, and an index for each DB query of a server.

10. The network monitoring method of claim 9, further comprising visualizing and displaying a results of the security monitoring of the network, wherein the visualizing is visualizing statistics of at least one indicator related to current network performance using at least one visualization method among creation of a meaningful graph, creation of a table, and creation of a flow map.

11. A monitoring device for monitoring a client terminal, the device configured to:

perform security monitoring on the client terminal to generate monitoring result information;

based on a result of the security monitoring, generate a security check packet containing user ID (UID) information of the client terminal, length information, and monitoring result information; and transmit the security check packet over a network.

12. The monitoring device of claim 11, wherein the network monitoring device is configured to determine whether a security problem has occurred on the client terminal based on at least one of the following: monitoring system log files of the terminal; determining an attempt to access the terminal from an IP not included in a whitelist of permitted IPs; analyzing packet information regarding the terminal; analyzing status information of the terminal; and obtaining alive information indicating a connectivity status of the terminal, and configured to generate the security check packet when it is determined that the security problem has occurred.

13. The network monitoring device of claim 11, wherein the security check packet is a TCP packet format that contains at least a TCP header and a TCP payload, and the TCP payload contains field information of at least one of a UID field, a length field, and a monitoring result field.

14. The network monitoring device of claim 11, wherein the security check packet is a UDP packet format that contains at least a UDP header and a UDP payload, and the UDP payload contains field information of at least one of a UID field, a length field, and a monitoring result field.

15. A network monitoring device for monitoring packets on a network, the device configured to:

obtain a security check packet transmitted from a client monitoring device that monitors the client terminal;

obtain a mirroring packet from a network switch device that mirrors packets; and perform security monitoring of the network by analyzing at least one of the security check packet and the mirroring packet.

16. The network monitoring device of claim 15, wherein the network monitoring device is configured to be assigned an IP address on the network and receive the security check packet as a TCP packet based on the IP address.

17. The network monitoring device of claim 15, wherein the network monitoring device is configured to obtain the security check packet as a UDP packet by monitoring packets on a path on the network, without being assigned an IP address on the network.

18. The network monitoring device of claim 15, wherein:

the network monitoring device comprises a packet analysis algorithm corresponding to at least one protocol among HTTP, IP, UDP, TCP, and DNS, and the packet analysis algorithm is configured to analyze the mirroring packet by adaptively extracting at least one of a URL, a source IP, a destination IP, and time information from the mirroring packet according to the at least one protocol, and configured to determine at least one of the following based on the mirroring packet: a user experience delay time on a user terminal, traffic up to a first server through the Internet, a latency in each server segment, a web latency, an app latency, a latency between servers, a latency for each server, a number of latency sessions (waits) for each server, an index for each application URI, and an index for each DB query of a server.

19. The network monitoring device of claim 18, wherein:

the network monitoring device is connected to a service module that visualizes a security monitoring result for the network by the network monitoring device, and the service module is configured to visualize statistics of at least one indicator related to current network performance using at least one visualization method among creation of a meaningful graph, creation of a table, and creation of a flow map.

20. The network monitoring device of claim 15, wherein the network monitoring device is located and operating in at least one of the following: a standalone network node connected to the network, an input or output end of a plane on the network, or a server which is a destination for a packet on the network.

* * * * *